(12) United States Patent
Ma et al.

(10) Patent No.: US 11,431,991 B2
(45) Date of Patent: Aug. 30, 2022

(54) CHROMA BLOCK PREDICTION METHOD AND DEVICE

(71) Applicant: Huawei Technologies Co., Ltd., Shenzhen (CN)

(72) Inventors: Xiang Ma, Shenzhen (CN); Haitao Yang, Shenzhen (CN); Jianle Chen, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/166,364

(22) Filed: Feb. 3, 2021

(65) Prior Publication Data

US 2021/0160514 A1    May 27, 2021

Related U.S. Application Data

(63) Continuation of application No. PCT/CN2019/104527, filed on Sep. 5, 2019.

(30) Foreign Application Priority Data

Sep. 5, 2018 (CN) .......................... 201811035923.5

(51) Int. Cl.
*H04N 19/00* (2014.01)
*H04N 19/186* (2014.01)
*H04N 19/176* (2014.01)

(52) U.S. Cl.
CPC ......... *H04N 19/186* (2014.11); *H04N 19/176* (2014.11)

(58) Field of Classification Search
CPC .... H04N 19/117; H04N 19/70; H04N 19/186; H04N 19/176
See application file for complete search history.

(56) References Cited

U.S. PATENT DOCUMENTS

2014/0140401 A1* 5/2014 Lee ...................... H04N 19/186
                                                  375/240.12
2016/0277762 A1* 9/2016 Zhang ................. H04N 19/593

FOREIGN PATENT DOCUMENTS

CN       103096057 A      5/2013
CN       103369315 A     10/2013
           (Continued)

OTHER PUBLICATIONS

Chen, J. et al., "CE6.a.4: Chroma intra prediction by reconstructed luma samples", Joint Collaborative Team on Video Coding (JCT-VC) of ITU-T SG16 WP3 and ISO/IEC JTC1/SC29/WG11, 5th Meeting: Mar. 16-23, 2011, JCTVC-E266, 10 pages, Geneva.

(Continued)

*Primary Examiner* — Zhihan Zhou
(74) *Attorney, Agent, or Firm* — Slater Matsil, LLP

(57) ABSTRACT

The present disclosure provides a chroma block prediction method and a device. The method includes: parsing a bitstream to obtain first indication information; downsampling a first luma block by a first filter when a value of the first indication information is a first value or by using a second filter when a value of the first indication information is a second value, to obtain a second luma block; obtaining a plurality of chroma samples and a plurality of luma samples; obtaining linear model coefficients based on the plurality of chroma samples and the plurality of luma samples; and obtaining a prediction value of the current chroma block based on the second luma block and the linear model coefficients.

18 Claims, 15 Drawing Sheets

(56) References Cited

FOREIGN PATENT DOCUMENTS

| CN | 103782596 | A | 5/2014 |
|---|---|---|---|
| CN | 107211121 | A | 9/2017 |
| CN | 107409209 | A | 11/2017 |
| JP | 2018514119 | A | 5/2018 |
| WO | 2013067944 | A1 | 5/2013 |
| WO | 2016154008 | A1 | 9/2016 |
| WO | 2018053293 | A1 | 3/2018 |

OTHER PUBLICATIONS

Jchen, J. et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, 7th Meeting:, Jul. 13-21, 2017, JVET-G1001-v1, 50 pages, Torino, IT.
Laroche G. et al., "Non-CE3: On cross-component linear model simplification", Joint Video Experts Team (JVET) of ITU-T SG 16 WP 3 and ISO/IEC JTC 1/SC 29/WG 11, 11th Meeting: Jul. 10-18, 2018, JVET-K0204-v3, 7 pages, Ljubljana, SI.
Chen, J., et al, "Algorithm Description of Joint Exploration Test Model 3", Joint Video Exploration Team (JVET) of ITU-T SG 16 WP 3 and ISO/IEC JTC 1/SC29/WG11, 3rd Meeting: May 26-Jun. 1, 2016, Document: JVET-C1001_V1, 35 pages, Geneva, CH.
Chen, J., et al, "Algorithm description for Versatile Video Coding and Test Model 6 (VTM 6)", Joint Video Experts Team (JVET) of ITU-T SG 16 WP 3 and ISO/IEC JTC I/SC 29/WG11, 15th Meeting: Jul. 3-12, 2019, Document: JVET-O2002-v1, 80 pages, Gothenburg, SE.
Van der Auwera, G., et al, "Description of Core Experiment 3: Intra Prediction and Mode Coding", Joint Video Experts Team (JVET) of ITU-T SG 16 WP 3 and ISO/IEC JTC 1/SC 29/WG11, 10th Meeting: Apr. 10-20, 2018, Document: JVET-J1023_r2, 50 pages, San Diego, USA.
Chen, J. et al., "Algorithm Description of Joint Exploration Test Model 3", Joint Video exploration Team (JVET) of ITU-T SG 16 WP 3 and ISO/IEC JTC 1/SC 29/WG 11, JVET-C1001_v3, May 26-Jun. 1, 2016, 2016, 38 pages., Geneva, CH.

* cited by examiner (a) 4:4:4 format   (b) 4:2:2 format   (c) 4:2:0 format

× Luma sample position
○ Chroma sample position, type 0
△ Chroma sample position, type 1
◇ Chroma sample position, type 2
0 Chroma sample position, type 3
□ Chroma sample position, type 4
▽ Chroma sample position, type 5

FIG. 7

CHROMA BLOCK PREDICTION METHOD AND DEVICE

CROSS-REFERENCE TO RELATED APPLICATIONS

This application is a continuation of International Application No. PCT/CN2019/104527, filed on Sep. 5, 2019, which claims priority to Chinese Patent Application No. 201811035923.5, filed on Sep. 5, 2018. The disclosures of the aforementioned applications are hereby incorporated by reference in their entireties.

TECHNICAL FIELD

The present disclosure relates to the field of video coding, and in particular, to a chroma block prediction method and a device.

BACKGROUND

As internet technologies rapidly develop and people's material and spiritual cultures are increasingly enriched, there are increasing demands on the internet for applications of videos, especially for applications of high-definition videos. However, a high-definition video contains a quite large amount of data. To transmit the high-definition video on the internet with a limited bandwidth, compression coding of the high-definition video needs to be performed first. Currently, two international organizations, The Moving Picture Expert Group (MPEG) in the International Organization for Standardization (ISO)/International Electrotechnical Commission (IEC) and the Video Coding Experts Group (VCEG) in the International Telegraph Union Telecommunication (ITU-T), are dedicated to formulating video coding standards. The MPEG, founded in 1986, is specialized in formulating related standards that are mainly used in storage, broadcast television, streaming media on the internet or a wireless network, and the like in the multimedia field. The ITU-T mainly formulates video coding standards for the field of real-time video communication, such as videotelephony, video conferencing, or other applications. Over the past few decades, video coding standards have been formulated for various applications, including MPEG-1 for VCD, MPEG-2 for DVD and DVB, H.261, H.263, and H.264 for video conferencing, MPEG-4 and HEVC that allows coding of objects in any shape, and the like.

Currently, in widely used video coding standards H.264/AVC (denoted as H.264) and H.265/HEVC (denoted as H.265), various types of coding operations such as prediction, transform, and entropy coding are performed by using an image block as a basic unit. An image block is a two-dimensional sample array, that is, an array with a size of W*H samples (where W may be equal or unequal to H). In addition, a value of a sample at each sample position is known.

A general video encoding process mainly includes the following stages: intra prediction, inter prediction, transform, quantization, entropy encoding, in-loop filtering, and the like. Intra prediction and inter prediction are performed after an image is partitioned into image blocks. Then, transform and quantization are performed after a residual is obtained. Finally, entropy encoding is performed to output a bitstream.

Intra prediction means that a sample value of a sample in a reconstructed region in a current image is used to predict a sample value of a sample in a current block. Generally, a prediction value of the sample in the current block is derived based on a sample in a reconstructed neighboring block around the current block. For example, in H.264 or H.265, boundary (a boundary near the current block) samples of a neighboring block are generally used as reference samples of the current block, and the prediction value of the sample in the current block is derived based on these reference samples by using a specific method. An intra prediction mode is, for example, a non-directional mode such as a DC (or mean) mode or a planar mode, or a directional mode as defined in H.265.

After prediction information is obtained through intra prediction, residual information is obtained by subtracting the corresponding prediction information from the sample value of the sample in the current coding block. Then, the residual information is transformed by using a method such as discrete cosine transform (DCT). Finally, a bitstream is obtained through quantization and entropy encoding. After a prediction signal and a reconstructed residual signal are added up, a filtering operation further needs to be performed, to obtain a reconstructed signal. The reconstructed signal is used as a reference signal for subsequent encoding.

Decoding is an inverse process of encoding. Entropy decoding, dequantization, and inverse transform are first performed to obtain residual information. A bitstream is decoded to determine whether intra prediction or inter prediction is used for a current block. If intra encoding is used, prediction information is constructed based on a sample value of a sample in a reconstructed region around a current image by using an intra prediction method. After the prediction information and the residual information are added up, reconstructed information may be obtained by performing a filtering operation.

An existing video is generally a color video. In addition to a luma component, an image in the color video further includes a chroma component. Therefore, the luma component needs to be coded, and the chroma component also needs to be coded. How to improve coding efficiency for the chroma component in intra prediction is still a technical challenge at present.

SUMMARY

Embodiments of the present disclosure provide a chroma block prediction method and a device, to improve coding efficiency for a chroma component (a chroma block) in intra prediction.

According to a first aspect, an embodiment of the present disclosure provides a chroma block prediction method. The method is described from a perspective of an encoder side. The method may be used in intra prediction for a current chroma block, and a used intra prediction mode is a linear model mode (LM mode for short). The method may include: determining a filter type based on a sample position type of the current chroma block, where the filter type is determined based on the sample position type of the current chroma block, and each sample position type of the current chroma block corresponds to a filter type; setting first indication information, where the first indication information is used to indicate the filter type; and encoding the first indication information into a bitstream, so that the bitstream is subsequently sent to a decoder side.

It can be learned that in this embodiment of the present disclosure, the encoder may determine, based on the sample position type of the current chroma sample, a luma downsampling filter used for a current luma block, and specify a type of the downsampling filter for the decoder through indication information. This ensures that both the encoder side and the decoder side can obtain the filter corresponding to the chroma sample position, thereby improving coding accuracy and coding efficiency of the encoder side.

Based on the first aspect, in a possible embodiment, six sample position types may be designed: a type0, a type1, a type2, a type3, a type4, and a type5. Accordingly, there are six types of luma downsampling filters corresponding to the six sample position types: a filter 0, a filter 1, a filter 2, a filter 3, a filter 4, and a filter 5. In other words, the sample position type of the current chroma block may be one of the six sample position types. By setting these filters, it is ensured that both the encoder side and the decoder side obtain the filter corresponding to the chroma sample position. This considers a case in which different chroma sample positions may exist in different video sequences in reality, thereby improving coding accuracy and coding efficiency of the encoder side.

Based on the first aspect, in a possible embodiment, it is considered that the chroma sample positions: the type0 and the type2 are most common currently, and two sample position types may be alternatively designed. In other words, the two sample position types include only the type0 and the type2. Accordingly, there are two types of luma downsampling filters, the filter 0 and the filter 2, corresponding to the two sample position types. In other words, the sample position type of the current chroma block may be one of the two sample position types. By setting these filters, coding accuracy and coding efficiency of the encoder side can be improved while most common coding requirements are satisfied.

Based on the first aspect, in a possible embodiment, a sequence parameter set (SPS) parameter may be newly added, and a value of the SPS parameter is used to indicate a type of a luma downsampling filter in the LM mode during encoding or decoding of a current video sequence. On the encoder side, this parameter may be set based on a chroma sample position in the current sequence. Specifically, the first indication information may be set based on the filter type. The first indication information may include the value of the SPS parameter, where the value is used to indicate the type of the luma downsampling filter used for prediction for the chroma block during encoding or decoding.

Based on the first aspect, in a possible embodiment, a plurality of intra prediction modes may be preset on the encoder side. The plurality of intra prediction modes include the LM mode. The encoder side traverses the plurality of intra prediction modes, and determines that an optimal intra prediction mode for the current chroma block is the LM mode. In addition, the encoder side may further set second indication information, where the second indication information is used to indicate the LM mode, and encode the second indication information into the bitstream, so that the decoder side also performs intra prediction in the LM mode, to improve coding efficiency.

Based on the first aspect, in a possible embodiment, during construction of a prediction block, the encoder side may further determine, based on the first indication information, a filter corresponding to the filter type; downsample a first luma block by using the filter corresponding to the filter type, to obtain a second luma block, where the first luma block is a luma block corresponding to the current chroma block; obtain a template chroma sample and a template luma sample, where the template chroma sample includes a plurality of neighboring chroma samples of the current chroma block, and the template luma sample is obtained by downsampling a plurality of neighboring luma samples of the first luma block; obtain linear model coefficients based on the template chroma sample and the template luma sample; and obtain a prediction value of the current chroma block based on the second luma block and the linear model coefficients.

According to a second aspect, an embodiment of the present disclosure provides a chroma block prediction method. The method may be used in intra prediction for a current chroma block, and a used intra prediction mode is an LM mode. The method includes: parsing a bitstream to obtain first indication information, where the first indication information is used to indicate a filter type; performing a downsampling operation on a first luma block by using a filter corresponding to the filter type, to obtain a second luma block, where the first luma block is a luma block corresponding to the current chroma block, and a position of a luma sample of the second luma block is consistent with a position of a chroma sample of the current chroma block; obtaining a template chroma sample and a template luma sample, where the template chroma sample includes a plurality of neighboring chroma samples of the current chroma block, and the template luma sample is obtained by performing a downsampling operation on a plurality of neighboring luma samples of the first luma block; obtaining linear model coefficients based on the template chroma sample and the template luma sample; and obtaining a prediction value of the current chroma block based on the second luma block and the linear model coefficients.

It can be learned that in this embodiment of the present disclosure, for the LM mode, a decoder side may determine, based on the indication information in the bitstream during downsampling of the current block, the filter used for downsampling of the luma block corresponding to the current chroma block. In this way, the filter corresponding to a chroma sample position can be obtained. This considers a case in which different chroma sample positions may exist in different video sequences in reality, thereby improving coding accuracy and coding efficiency.

Specifically, in this embodiment of the present disclosure, a neighboring top side and a neighboring left side that are used for calculation of the linear model coefficients may be referred to as templates. The template is a set of luma samples or a set of chroma samples used for calculation of the linear model coefficients. The set of luma samples used for calculation of the linear model coefficients may also be referred to as the template luma sample. The template luma sample is obtained by performing the downsampling operation on the plurality of neighboring luma samples of the luma block (because in a luma image, there may be no luma sample value at a position corresponding to the template chroma sample). The set of chroma samples used for calculation of the linear model coefficients may also be referred to as the template chroma sample. The template chroma sample includes the plurality of neighboring reconstructed chroma samples of the current chroma block.

Based on the second aspect, in a possible embodiment, the template chroma sample specifically includes one or more rows of neighboring top chroma samples of the current chroma block, and one or more columns of neighboring left chroma samples of the current chroma block. The template luma sample one-to-one corresponds to the template chroma sample, and a value of a sample in the template luma sample and a value of a sample in the template chroma sample constitute a value pair.

Based on the second aspect, in a possible embodiment, the template chroma sample includes one row of neighboring top chroma samples and one column of neighboring left chroma samples of the current chroma block. Accordingly, the template luma sample includes one row of luma samples and one column of left luma samples, where the one row of luma samples and the one column of left luma samples correspond to chroma sample positions in the template chroma sample.

Based on the second aspect, in a possible embodiment, the template chroma sample includes two rows of neighboring top chroma samples and two columns of neighboring left chroma samples of the current chroma block. Accordingly, the template luma sample includes two rows of luma samples and two columns of luma samples, where the two rows of luma samples and the two columns of luma samples correspond to chroma sample positions in the template chroma sample.

Based on the second aspect, in a possible embodiment, the template chroma sample may alternatively include only one or more columns of neighboring left chroma samples of the current chroma block. The template luma sample includes only one or more columns of luma samples, and template luma samples one-to-one correspond to template chroma samples.

Based on the second aspect, in a possible embodiment, the template chroma sample may alternatively include only one or more rows of neighboring top chroma samples of the current chroma block. The template luma sample includes only one or more rows of luma samples, and template luma samples one-to-one correspond to template chroma samples.

Based on the second aspect, in a possible embodiment, for the template luma sample, because the first indication information indicates the filter type, the downsampling operation may be performed on the plurality of neighboring luma samples of the first luma block by using the filter corresponding to the filter type, to obtain the template luma sample. In this way, the decoder side uses the same filter in a downsampling process of deriving the template luma sample and a downsampling process of the current block, thereby improving processing efficiency.

For example, if six filter types are designed for the decoder side, and a value currently indicated by the first indication information is 0, a used luma downsampling filter is a filter 0, and the downsampling operation may be performed on the plurality of neighboring luma samples of the first luma block by using the filter 0, to obtain a value of each luma sample in the template luma sample.

Based on the second aspect, in a possible embodiment, during parsing of the bitstream, second indication information may be further obtained by parsing the bitstream. The second indication information is used to indicate that the intra prediction mode used by the decoder side to decode the current chroma block is the LM mode, so that the decoder side determines to use the LM mode for intra prediction for a current image in a video sequence.

Based on the second aspect, in a possible embodiment, the method is used for decoding of a current image block in the video sequence. The current image block includes the first luma block and the current chroma block, and the image in the video sequence is in a 4:2:0 format or a 4:2:2 format.

Based on the second aspect, in a possible embodiment, an encoder side and the decoder side may use a same design of a filter type. For example, six filter types (corresponding to six chroma sample positions) are designed for the encoder side, and six filter types are also designed for the decoder side. In addition, downsampling algorithms of the six filter types of the decoder side are respectively consistent with downsampling algorithms of the six filter types of the encoder side. For another example, two filter types (corresponding to two chroma sample positions) are designed for the encoder side, and two filter types are also designed for the decoder side. In addition, downsampling algorithms of the two filter types of the decoder side are respectively consistent with downsampling algorithms of the two filter types of the encoder side.

Based on the second aspect, in a possible embodiment, the first indication information includes a value of an SPS parameter, where the value is used to indicate a type of the luma downsampling filter used for prediction for the chroma block during encoding or decoding.

Based on the second aspect, in a possible embodiment, the obtaining linear model coefficients based on the template chroma sample and the template luma sample includes: obtaining linear model coefficients $\alpha$ and $\beta$ based on the template chroma sample and the template luma sample by using a least square method.

Based on the second aspect, in a possible embodiment, the obtaining linear model coefficients based on the template chroma sample and the template luma sample includes: obtaining linear model coefficients $\alpha$ and $\beta$ based on the template chroma sample and the template luma sample by using an extremum method.

According to a third aspect, a method may be used in intra prediction for a current chroma block. The method may be described from a perspective of a decoder side, and a used intra prediction mode is, for example, an LM mode. The method includes: determining a filter type based on a sample position of the current chroma block; performing a downsampling operation on a first luma block by using a filter corresponding to the filter type, to obtain a second luma block, where the first luma block is a luma block corresponding to the current chroma block; obtaining a template chroma sample and a template luma sample, where the template chroma sample includes a plurality of neighboring chroma samples of the current chroma block, and the template luma sample is obtained by performing a downsampling operation on a plurality of neighboring luma samples of the first luma block; obtaining linear model coefficients based on the template chroma sample and the template luma sample; and obtaining a prediction value of the current chroma block based on the second luma block and the linear model coefficients.

It can be learned that in this embodiment of the present disclosure, an encoder may determine, based on a sample position of the current chroma block, a luma downsampling filter used for a current luma block, to obtain a filter corresponding to the chroma sample position. This considers a case in which different chroma sample positions may exist in different video sequences in reality, thereby improving coding accuracy and coding efficiency.

Based on the third aspect, in a possible embodiment, before the determining a filter type based on a sample position of the current chroma block, the method includes: parsing a bitstream to obtain first indication information, where the first indication information is used to indicate the sample position of the current chroma block. The sample position of the current chroma block may be associated with the filter type.

It can be learned that in this embodiment of the present disclosure, the encoder may determine the sample position of the current chroma sample based on the first indication information, to obtain the filter corresponding to the chroma sample position. Both the encoder side and a decoder side can obtain the filter corresponding to the chroma sample position, thereby improving coding accuracy and coding efficiency of the encoder side.

Based on the third aspect, in a possible embodiment, the sample position of the current chroma block may be determined, for example, based on a sample position type of the current chroma block. The sample position type of the current chroma block may be associated with the filter type.

In an implementation, the sample position type of the current chroma block is at least one of the following sample position types: a sample position type type0 and a sample position type type2.

In another implementation, the sample position type of the current chroma block is at least one of the following sample position types: a sample position type type0, a sample position type type1, a sample position type type2, a sample position type type3, a sample position type type4, and a sample position type type5.

Based on the third aspect, in a possible embodiment, the parsing a bitstream to obtain first indication information includes: parsing a sequence parameter set (SPS) parameter in the bitstream, to obtain the first indication information. During implementation of this embodiment, the encoder side may indicate the sample position type of the current chroma block to the decoder side through a specific SPS parameter. This is equivalent to specifying a type of the downsampling filter for the decoder side, thereby ensuring that both the encoder side and the decoder side can obtain the filter corresponding to the chroma sample position.

According to a fourth aspect, an embodiment of the present disclosure provides a video data encoding device. The device includes a memory and an encoder coupled to the memory. The memory is configured to store video data in a bitstream form. The encoder is configured to: determine a filter type based on a sample position type of a current chroma block; set first indication information, where the first indication information is used to indicate the filter type; and encode the first indication information into a bitstream. Specifically, the device may be configured to implement the method described in the first aspect.

According to a fifth aspect, an embodiment of the present disclosure provides a video data decoding device. The device includes a memory and a decoder coupled to the memory. The memory is configured to store video data in a bitstream form. The decoder is configured to: parse a bitstream to obtain first indication information, where the first indication information is used to indicate a filter type; perform a downsampling operation on a first luma block by using a filter corresponding to the filter type, to obtain a second luma block, where the first luma block is a luma block corresponding to a current chroma block; obtain a template chroma sample and a template luma sample, where the template chroma sample includes a plurality of neighboring chroma samples of the current chroma block, and the template luma sample is obtained by performing a downsampling operation on a plurality of neighboring luma samples of the first luma block; obtain linear model coefficients based on the template chroma sample and the template luma sample; and obtain a prediction value of the current chroma block based on the second luma block and the linear model coefficients. Specifically, the device may be configured to implement the method described in the second aspect.

According to a sixth aspect, an embodiment of the present disclosure provides a video data decoding device. The device includes a memory and a decoder coupled to the memory. The memory is configured to store video data in a bitstream form. The decoder is configured to: determine a filter type based on a sample position type of a current chroma block; perform a downsampling operation on a first luma block by using a filter corresponding to the filter type, to obtain a second luma block, where the first luma block is a luma block corresponding to the current chroma block; obtain a template chroma sample and a template luma sample, where the template chroma sample includes a plurality of neighboring chroma samples of the current chroma block, and the template luma sample is obtained by performing a downsampling operation on a plurality of neighboring luma samples of the first luma block; obtain linear model coefficients based on the template chroma sample and the template luma sample; and obtain a prediction value of the current chroma block based on the second luma block and the linear model coefficients. Specifically, the device may be configured to implement the method described in the third aspect.

According to a seventh aspect, an embodiment of the present disclosure provides an encoding device. The encoding device includes a nonvolatile memory and a processor that are coupled to each other. The processor invokes program code stored in the memory to perform the method described in the first aspect.

According to an eighth aspect, an embodiment of the present disclosure provides a decoding device. The decoding device includes a nonvolatile memory and a processor that are coupled to each other. The processor invokes program code stored in the memory to perform the method described in the second aspect.

According to a ninth aspect, an embodiment of the present disclosure provides a decoding device. The decoding device includes a nonvolatile memory and a processor that are coupled to each other. The processor invokes program code stored in the memory to perform the method described in the third aspect.

According to a tenth aspect, an embodiment of the present disclosure provides a system. The system includes the device described in the fourth aspect and the device described in the fifth aspect, or the system includes the device described in the fourth aspect and the device described in the sixth aspect.

According to an eleventh aspect, an embodiment of the present disclosure provides another system. The system includes the encoding device described in the seventh aspect and the decoding device described in the eighth aspect, or the system includes the encoding device described in the seventh aspect and the decoding device described in the ninth aspect.

According to a twelfth aspect, an embodiment of the present disclosure provides a nonvolatile computer-readable storage medium. The computer-readable storage medium is configured to store program code of the method described in the first aspect. When the program code is executed by a computing device, the computing device is configured to perform the method described in the first aspect.

According to a thirteenth aspect, an embodiment of the present disclosure provides another nonvolatile computer-readable storage medium. The computer-readable storage medium is configured to store program code of the method described in the second aspect or the third aspect. When the program code is executed by a computing device, the computing device is configured to perform the method described in the second aspect or the third aspect.

According to a fourteenth aspect, an embodiment of the present disclosure provides a computer program product. The computer program product includes a program instruction. When the computer program product is executed by a computing device, the computing device performs the method described in the first aspect. The computer program product may be a software installation package. When the method provided in any possible design of the first aspect needs to be used, the computer program product may be downloaded and executed on the computing device, to implement the method described in the first aspect.

According to a fifteenth aspect, an embodiment of the present disclosure provides another computer program product. The computer program product includes a program instruction. When the computer program product is executed by a computing device, the computing device performs the method provided in any possible design of the second aspect or the third aspect. The computer program product may be a software installation package. When the method provided in any possible design of the second aspect or the third aspect needs to be used, the computer program product may be downloaded and executed on the computing device, to implement the method described in the second aspect or the third aspect.

It can be learned that in the embodiments of the present disclosure, for the LM mode, the encoder may determine, based on the sample position of the current chroma block, the luma downsampling filter used for the current luma block, and specify the type of the downsampling filter for the decoder through the indication information (for example, the value of the newly added SPS parameter). This ensures that both the encoder side and the decoder side can obtain the filter corresponding to the chroma sample position. This considers the case in which different chroma sample positions may exist in different video sequences in reality, thereby ensuring consistency between a downsampled luma sample position and the chroma sample position, and improving coding accuracy and coding efficiency of the encoder side.

BRIEF DESCRIPTION OF THE DRAWINGS

To describe the technical solutions in the embodiments of the present disclosure or the background more clearly, the following describes the accompanying drawings used in the embodiments of the present disclosure or the background.

FIG. 7 is a schematic diagram of a relationship between a chroma sample position and a luma sample position;

DETAILED DESCRIPTION OF ILLUSTRATIVE EMBODIMENTS

Figure 1A:
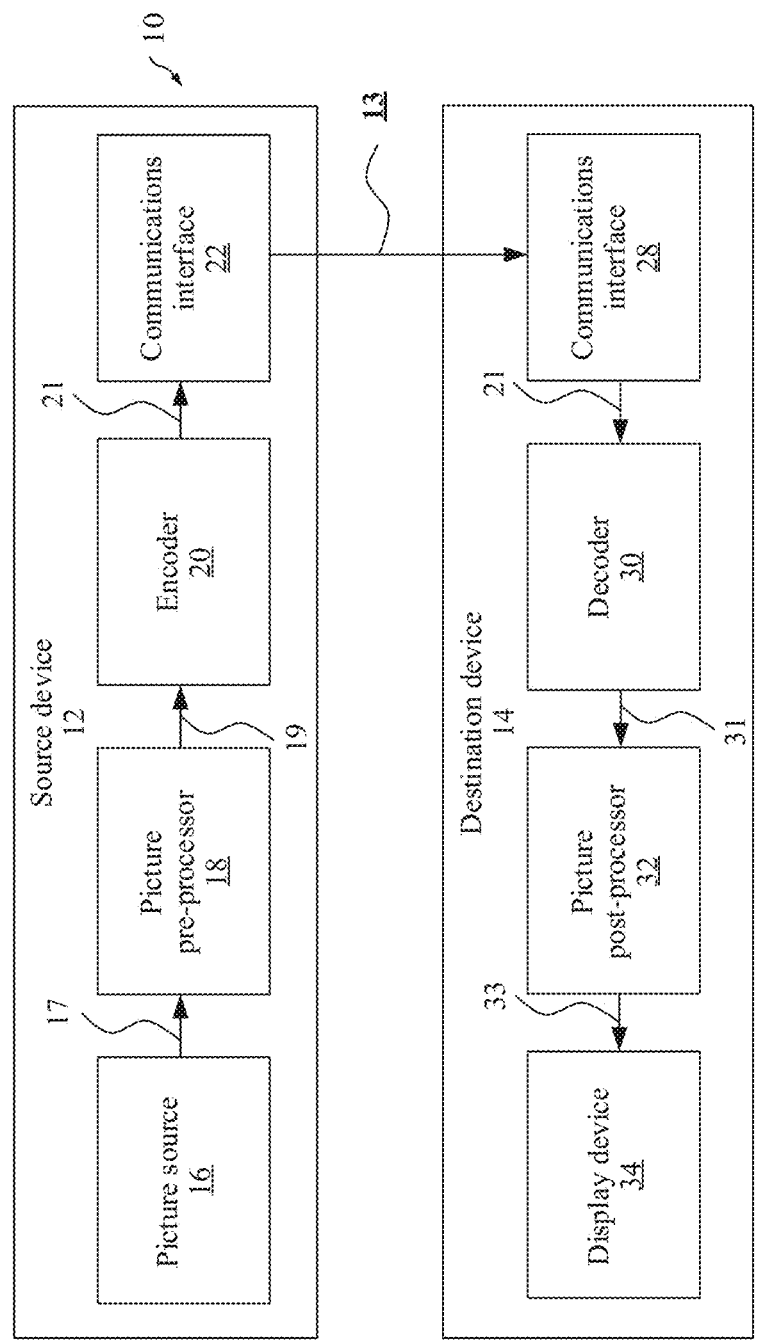
FIG. 1A is a block diagram of an example video coding system for implementing an embodiment of the present disclosure.

The following describes the embodiments of the present disclosure with reference to the accompanying drawings in the embodiments of the present disclosure. Terms used in implementations of the present disclosure are merely intended to explain specific embodiments of the present disclosure, but are not intended to limit the present disclosure.

Video coding typically refers to processing of a sequence of pictures, which form a video or a video sequence. In the field of video coding, the terms "picture", "frame", and "image" may be used as synonyms. Video coding used in this specification refers to video encoding or video decoding. Video encoding is performed on a source side, and usually includes processing (for example, by compressing) an original video picture to reduce an amount of data for representing the video picture, for more efficient storage and/or transmission. Video decoding is performed on a destination side, and typically includes inverse processing in comparison with processing of the encoder, to reconstruct the video picture. "Coding" of a video picture in the embodiments should be understood as "encoding" or "decoding" of a video sequence. A combination of an encoding part and a decoding part is also referred to as CODEC (encoding and decoding).

Each of a plurality of pictures in a video sequence is typically partitioned into a set of non-overlapping blocks and coding is typically performed at a block level. In other words, on an encoder side, a video is typically processed, that is, encoded, at a block (also referred to an image block or a video block) level, for example, by using spatial (intra picture) prediction and/or temporal (inter picture) prediction to generate a prediction block, subtracting the prediction block from a current block (a block that is currently being processed/to be processed) to obtain a residual block, and transforming the residual block and quantizing the residual block in a transform domain to reduce an amount of data to be transmitted (compressed), whereas on a decoder side, inverse processing in comparison with processing of the encoder is applied to the encoded or compressed block to reconstruct the current block for representation. Furthermore, the encoder duplicates a decoder processing loop so that both generate identical prediction (for example, intra prediction and inter prediction) and/or reconstruction for processing, that is, coding, subsequent blocks.

The term "block" is a part of a picture or a frame. In this specification, a current block is a block that is currently being processed. For example, during encoding, the current block is a block that is currently being encoded; and during decoding, the current block is a block that is being decoded. If the block that is currently being processed is a chroma component block, the block is referred to as a current chroma block. A luma block corresponding to the current chroma block may be referred to as a current luma block. A reference block is a block that provides a reference signal for the current block. The reference signal represents a sample value, a sample value, or a sample signal in an image block. A prediction block is a block that provides a prediction signal for the current block. The prediction signal represents a sample value, a sample value, or a sample signal in the prediction block. For example, after a plurality of reference blocks are traversed, an optimal reference block is found. The optimal reference block provides prediction for the current block, and this block is referred to as the prediction block.

In addition, in this specification, a sample (or a pel) may also be referred to as a pixel. Correspondingly, a sample value may also be referred to as a value of the sample (or a pixel value). If a sample included in a current block is a luma sample, the current block may be referred to as a current luma block (or referred to as a current luma image block). If a sample included in a current image block is a chroma sample, the current image block may be referred to as a current chroma block (or referred to as a current chroma image block).

The following describes a system architecture to which an embodiment of the present disclosure is applied. FIG. 1A is a block diagram of an example video coding system 10 described in an embodiment of the present disclosure. As used in this specification, the term "video codec" generally refers to both a video encoder and a video decoder. In this specification, the term "video coding" or "coding" may generally refer to video encoding or video decoding. As shown in FIG. 1A, the video coding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. The source device 12, the destination device 14, or various implementation solutions of the source device 12 or the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, laptop) computer, a tablet computer, a set top box, a handheld telephone set such as a "smartphone", a television set, a camera, a display apparatus, a digital media player, a video game console, an in-vehicle computer, and a similar apparatus.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communication standard (for example, a wireless communication protocol), and may transmit modulated video data to the destination device 14. The one or more communications media may include a wireless communications medium and/or a wired communications medium, for example, a radio frequency (RF) spectrum or one or more physical transmission lines. The one or more communications media may constitute a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20, and optionally, the source device 12 may further include a picture source 16, a picture pre-processor 18, and a communications interface 22. In a specific implementation form, the encoder 20, the picture source 16, the picture pre-processor 18, and the communications interface 22 may be hardware components in the source device 12, or may be software programs on the source device 12. Separate descriptions are as follows.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface for storing a previously captured or generated picture and/or for obtaining or receiving a picture. When the picture source 16 is a camera, the picture source 16 may be, for example, a local camera or an integrated camera integrated into the source device. When the picture source 16 is a memory, the picture source 16 may be, for example, a local memory or an integrated memory integrated into the source device. When the picture source 16 includes an interface, the interface may be, for example, an external interface for receiving a picture from an external video source. The external video source is, for example, an external picture capture device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of samples with luma values. A sample in the array may also be referred to as a sample (a short form of picture element) or a pel. A quantity of samples in horizontal and vertical directions (or axes) of the array or the picture defines a size and/or a resolution of the picture. For representation of a color, three color components are typically used. For example, the picture may be represented as or include three sample arrays. In an RGB format or a color space, a picture includes corresponding red, green and blue sample arrays. However, in video coding, each sample is typically represented in a luminance/chrominance format or a color space. For example, a picture in a YUV format includes a luminance component indicated by Y (sometimes L is used instead) and two chrominance components indicated by U and V. The luminance (short for luma) component Y represents brightness or gray level intensity (for example, the two are identical in a gray-scale picture), while the two chrominance (short for chroma) components U and V represent chromaticity or color information components. Accordingly, the picture in the YUV format includes a luma sample array of luma sample values (Y) and two chroma sample arrays of chroma values (U and V). A picture in the RGB format may be converted or transformed into a picture in the YUV format and vice versa, and the process is also known as color transformation or conversion. If a picture is monochrome, the picture may include only a luma sample array. In this embodiment of the present disclosure, a picture transmitted by the picture source 16 to a picture processor may also be referred to as raw picture data 17. In a possible embodiment of the present disclosure, the picture source 16 may be further configured to determine a chroma sample position of each picture in a current video sequence.

The picture pre-processor 18 is configured to receive the raw picture data 17 and pre-process the raw picture data 17, to obtain a pre-processed picture 19 or pre-processed picture data 19. For example, the pre-processing performed by the picture pre-processor 18 may include trimming, color format conversion (for example, from an RGB format to a YUV format), color correction, or de-noising. In a possible embodiment, the picture pre-processor 18 may be further configured to determine the chroma sample position in the current video sequence.

The encoder 20 (also referred to as the video encoder 20) is configured to receive the pre-processed picture data 19, and process the pre-processed picture data 19 in a related prediction mode (for example, an intra prediction mode in this embodiment of this specification), to provide encoded picture data 21 (structural details of the encoder 20 are further described below based on FIG. 2, FIG. 4, or FIG. 5). In some embodiments, the encoder 20 may be configured to perform the embodiments described below, to implement application of the chroma block prediction method on the encoder side described in the present disclosure.

The communications interface 22 may be configured to receive the encoded picture data 21, and transmit the encoded picture data 21 to the destination device 14 or any other device (for example, a memory) through the link 13 for storage or direct reconstruction. The any other device may be any device used for decoding or storage. The communications interface 22 may be, for example, configured to package the encoded picture data 21 into an appropriate format, for example, a data packet, for transmission through the link 13.

The destination device 14 includes a decoder 30, and optionally, the destination device 14 may further include a communications interface 28, a picture post-processor 32, and a display device 34. Separate descriptions are as follows.

The communications interface 28 may be configured to receive the encoded picture data 21 from the source device 12 or any other source. The any other source is, for example, a storage device, and the storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection, and the any type of network is, for example, a wired or wireless network or any combination thereof, or any type of private or public network, or any combination thereof. The communications interface 28 may be, for example, configured to de-package the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to set up a connection, and acknowledge and exchange any other information related to a communication link and/or data transmission such as encoded picture data transmission.

The decoder 30 (also referred to as the video decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform the embodiments described below, to implement application of the chroma block prediction method on the decoder side described in the present disclosure.

The picture post-processor 32 is configured to post-process the decoded picture data 31 (also referred to as reconstructed picture data), to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, may be an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, embodiments of devices may also include both or both functionalities: the source device 12 or a corresponding functionality and the destination device 14 or a corresponding functionality. In such embodiments, the source device 12 or the corresponding functionality and the destination device 14 or the corresponding functionality may be implemented by using same hardware and/or software or by using separate hardware and/or software or any combination thereof.

A person skilled in the art may be learned that based on the descriptions, existence and (exact) division of functionalities of the different units or functionalities of the source device 12 and/or the destination device 14 shown in FIG. 1A may vary depending on an actual device and application. The source device 12 and the destination device 14 each may be any one of a wide range of devices, including any type of handheld or stationary device, for example, a notebook or laptop computer, a mobile phone, a smartphone, a pad or a tablet computer, a video camera, a desktop computer, a set top box, a television, a camera, a vehicle-mounted device, a display device, a digital media player, a video game console, a video streaming device (such as a content service server or a content distribution server), a broadcast receiver device, or a broadcast transmitter device, and may not use or may use any type of operating system.

The encoder 20 and the decoder 30 each may be implemented as any of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store a software instruction in an appropriate and non-transitory computer-readable storage medium and may execute an instruction by using hardware such as one or more processors, to perform the technologies of this disclosure. Any of the foregoing (including hardware, software, a combination of hardware and software, and the like) may be considered as one or more processors.

In some cases, the video coding system 10 shown in FIG. 1A is merely an example and the technologies in this application are applicable to video coding settings (for example, video encoding or video decoding) that do not necessarily include any data communication between the encoding device and the decoding device. In other examples, data may be retrieved from a local memory, streamed over a network, or the like. A video encoding device may encode data and store encoded data into the memory, and/or a video decoding device may retrieve data from the memory and decode the data. In some examples, the encoding and the decoding are performed by devices that do not communicate with each other, but simply encode data to the memory and/or retrieve data from the memory and decode the data.

Figure 1B:
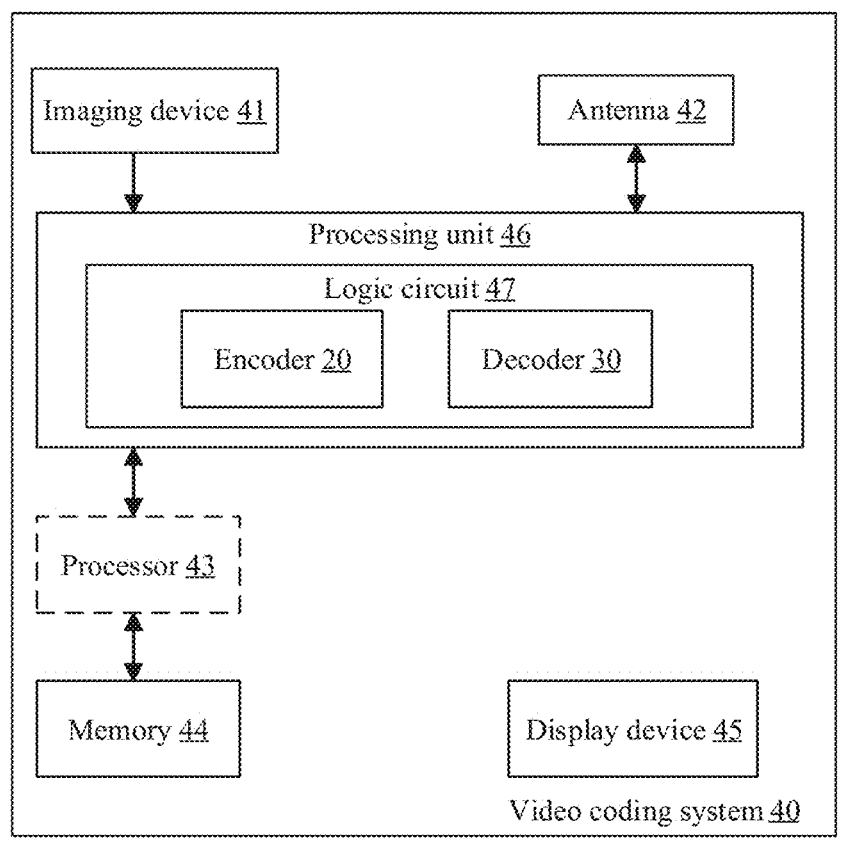
FIG. 1B is a block diagram of an example video coding system including any one or two of an encoder 20 in FIG. 2 and a decoder 30 in FIG. 3.
Figure 2:
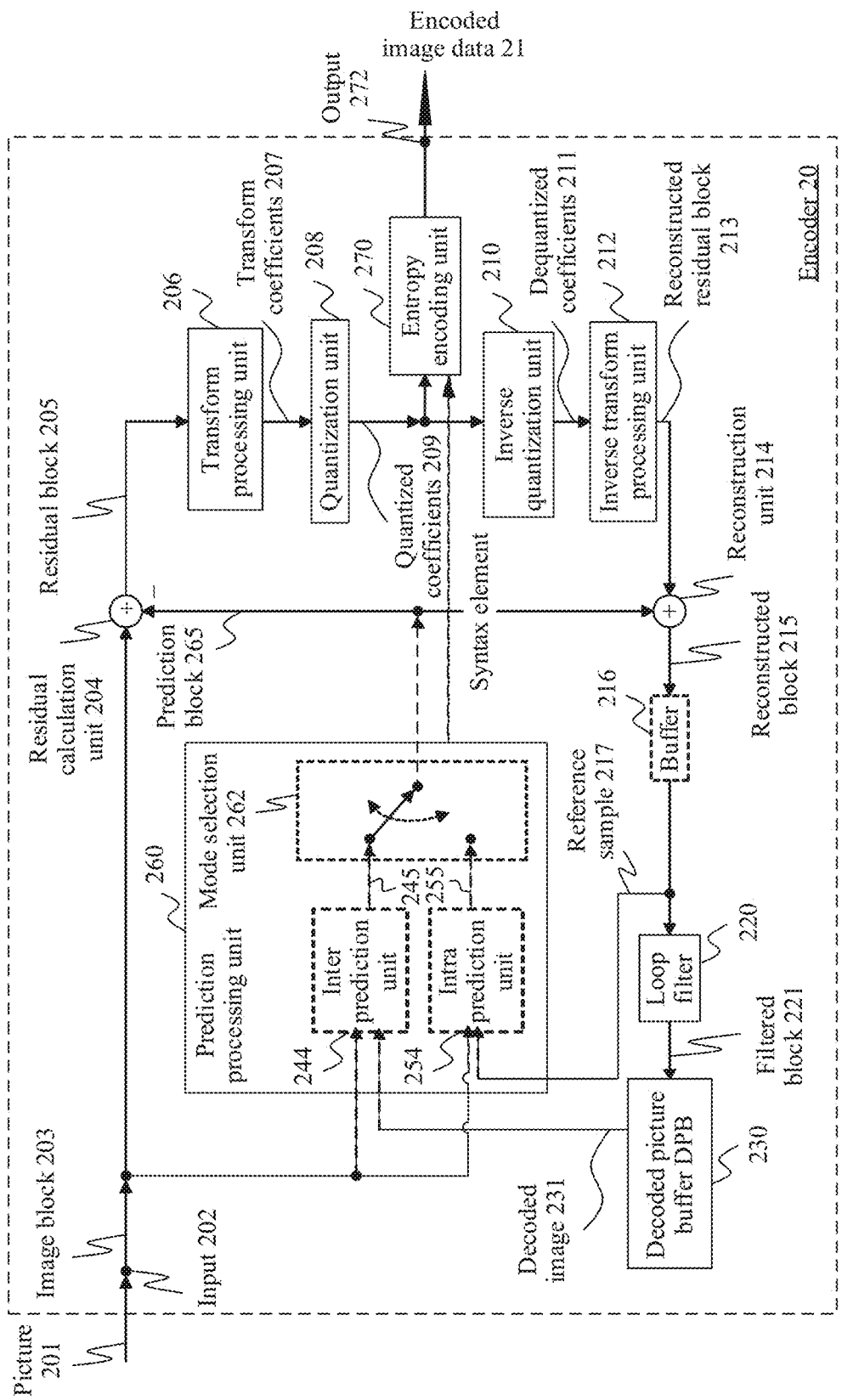
FIG. 2 is a block diagram of an example structure of an encoder for implementing an embodiment of the present disclosure.
Figure 3:
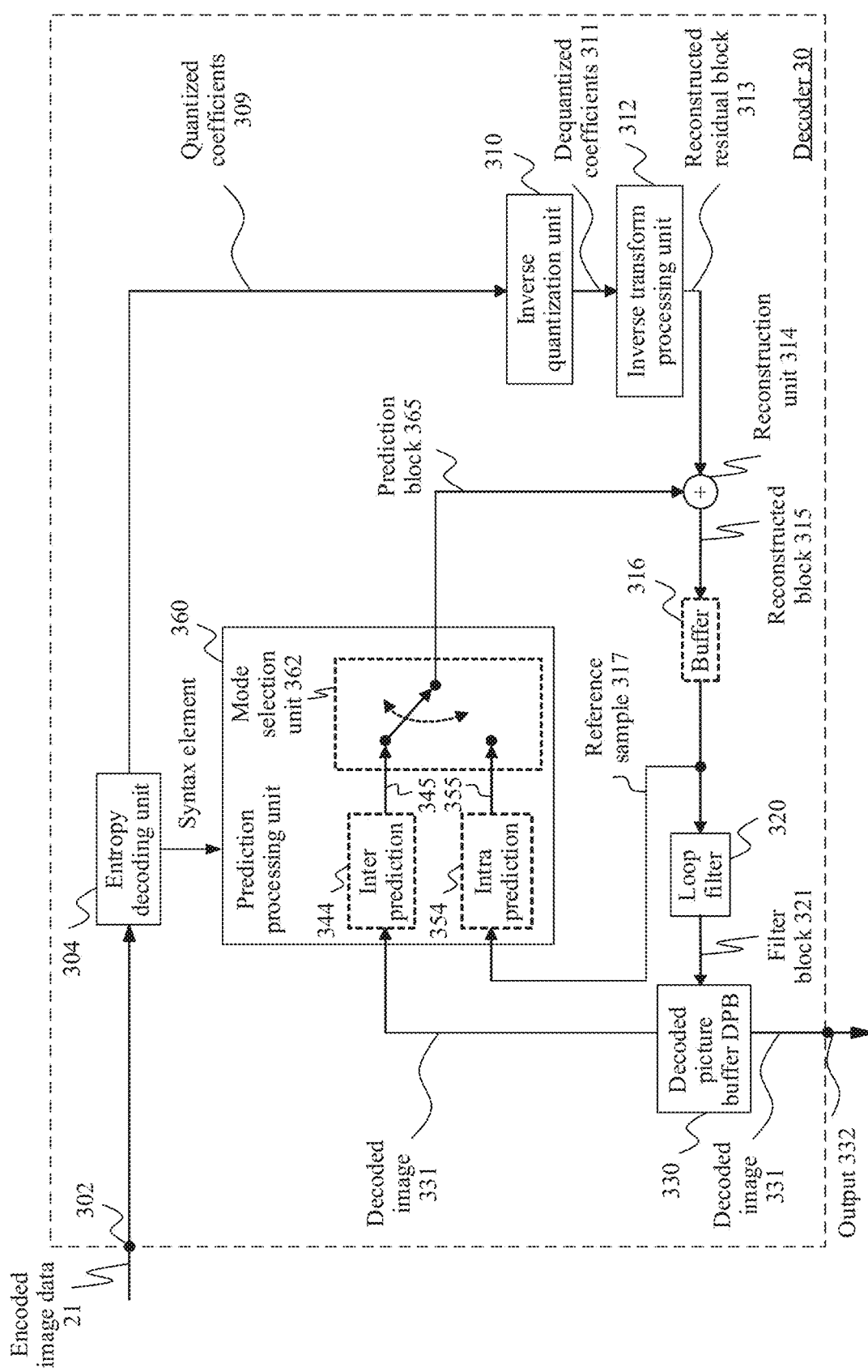
FIG. 3 is a block diagram of an example structure of a decoder for implementing an embodiment of the present disclosure.

FIG. 1B is an illustrative diagram of an example of a video coding system 40 including the encoder 20 in FIG. 2 and/or the decoder 30 in FIG. 3 according to an example embodiment. The video coding system 40 can implement a combination of various technologies in the embodiments of the present disclosure. In an illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated by using the encoder 20 and the decoder 30, the video coding system 40 may include only the encoder 20 or only the decoder 30 in different examples.

In some examples, the antenna 42 may be configured to transmit or receive an encoded bitstream of video data. Further, in some examples, the display device 45 may be configured to present the video data. In some examples, the logic circuit 47 may be implemented by the processing unit 46. The processing unit 46 may include an application-specific integrated circuit (ASIC) logic, a graphics processor, a general-purpose processor, or the like. The video coding system 40 may also include the optional processor 43. The optional processor 43 may similarly include an application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-limiting example, the memory 44 may be implemented by a cache memory. In some examples, the logic circuit 47 may access the memory 44 (for example, for implementation of an image buffer). In other examples, the logic circuit 47 and/or the processing unit 46 may include a memory (for example, a cache) for implementation of an image buffer or the like.

In some examples, the encoder 20 implemented by the logic circuit may include an image buffer (for example, implemented by the processing unit 46 or the memory 44) and a graphics processing unit (for example, implemented by the processing unit 46). The graphics processing unit may be communicatively coupled to the image buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may include an image buffer (for example, implemented by the processing unit 46 or the memory 44) and a graphics processing unit (for example, implemented by the processing unit 46). The graphics processing unit may be communicatively coupled to the image buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like related to video frame coding described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that in this embodiment of the present disclosure, for the example described with reference to the encoder 20, the decoder 30 may be configured to perform a reverse process. With regard to a signaling syntax element, the decoder 30 may be configured to receive and parse such a syntax element and correspondingly decode related video data. In some examples, the encoder 20 may entropy encode the syntax element into an encoded video bitstream. In such examples, the decoder 30 may parse such a syntax element and correspondingly decode related video data.

It should be noted that the chroma block prediction method described in the embodiments of the present disclosure is mainly used in an intra prediction process, and the process exists on both the encoder 20 and the decoder 30. The encoder 20/the decoder 30 in the embodiments of the present disclosure may be an encoder/decoder corresponding to a video standard protocol such as H.263, H.264, HEVC, MPEG-2, MPEG-4, VP8, or VP9, or corresponding to a next-generation video standard protocol (such as H.266).

FIG. 2 is a schematic/conceptual block diagram of an example encoder 20 configured to implement an embodiment of the present disclosure. In the example of FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 3).

The encoder 20 receives, for example, through an input 202, a picture 201 or an image block 203 of a picture 201, for example, a picture in a sequence of pictures forming a video or a video sequence. The image block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

An embodiment of the encoder 20 may include a partitioning unit (not depicted in FIG. 2), configured to partition the picture 201 into a plurality of blocks such as the image block 203. The picture 201 is usually partitioned into a plurality of non-overlapping blocks. The partitioning unit may be configured to use a same block size for all pictures in a video sequence and a corresponding grid defining the block size, or change a block size between pictures or subsets or picture groups and partition each picture into corresponding blocks.

In an example, the prediction processing unit 260 of the encoder 20 may be configured to perform any combination of the partitioning techniques described above.

Like the picture 201, the image block 203 is also or may be considered as a two-dimensional array or matrix of samples with luma values (sample values), although a size of the image block 203 is smaller than that of the picture 201. In other words, the image block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the image block 203 defines the size of the image block 203.

The encoder 20 shown in FIG. 2 is configured to encode the picture 201 block by block, for example, encode and predict each image block 203.

The residual calculation unit 204 is configured to calculate a residual block 205 based on the picture image block 203 and a prediction block 265 (further details about the prediction block 265 are provided below), for example, obtain the residual block 205 in a sample domain by subtracting a sample value of the prediction block 265 from a sample value of the picture image block 203 sample by sample.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply an integer approximation of DCT/DST, such as transforms specified in HEVC/H.265. Compared with an orthogonal DCT transform, such an integer approximation is typically scaled by a specific factor. To preserve a norm of a residual block that is processed by using forward and inverse transforms, applying an additional scale factor is a part of a transform process. The scale factor is typically chosen based on some constraints. For example, the scale factor is a power of two for a shift operation, a bit depth of the transform coefficient, a tradeoff between accuracy and implementation costs, and the like. A specific scaling factor is, for example, specified for an inverse transform, for example, by the inverse transform processing unit 212 on the decoder side 30 (and the corresponding inverse transform, for example, by the inverse transform processing unit 212 on the encoder side 20), and a corresponding scaling factor for the forward transform, for example, by the transform processing unit 206 on the encoder side 20 may be specified accordingly.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. A quantization process may reduce a bit depth associated with some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, whereas a larger quantization step corresponds to coarser quantization. An appropriate quantization step size may be indicated by the quantization parameter (QP). The quantization parameter may be, for example, an index to a predefined set of appropriate quantization step sizes. For example, a smaller quantization parameter may correspond to finer quantization (a smaller quantization step size) and a larger quantization parameter may correspond to coarser quantization (a larger quantization step size) or vice versa. The quantization may include division by a quantization step size and a corresponding quantization and/or inverse quantization, for example, performed by the inverse quantization unit 210, or may include multiplication by the quantization step size. In embodiments according to some standards such as HEVC, a quantization parameter may be used to determine the quantization step size. Generally, the quantization step size may be calculated based on a quantization parameter by using a fixed point approximation of an equation including division. An additional scaling factor may be introduced for quantization and dequantization to restore the norm of the residual block, where the norm of the residual block may be modified because of a scale used in the fixed point approximation of the equation for the quantization step size and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step size.

The inverse quantization unit 210 is configured to apply inverse quantization of the quantization unit 208 to quantized coefficients to obtain dequantized coefficients 211, for example, apply, based on or by using a same quantization step as the quantization unit 208, an inverse quantization scheme of a quantization scheme applied by the quantization unit 208. The dequantized coefficients 211 may also be referred to as dequantized residual coefficients 211 and correspond, although typically not identical to the transform coefficients due to the loss by quantization, to the transform coefficients 207.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, a reconstructed residual block 213) to the prediction block 265 to obtain a reconstructed block 215 in the sample domain, for example, by adding a sample value of the reconstructed residual block 213 and the sample value of the prediction block 265.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, an embodiment of the encoder 20 may be configured so that the buffer unit 216 is not only used for storing the reconstructed block 215 for the intra prediction unit 254 but also used for the loop filter unit 220 (not shown in FIG. 2), and/or so that, for example, the buffer unit 216 and the decoded picture buffer unit 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter unit 220 (briefly referred to as a "loop filter" 220) is configured to filter the reconstructed block 215 to obtain the filtered block 221, to smooth sample transition or improve video quality. The loop filter unit 220 is intended to represent one or more loop filters including, for example, a de-blocking filter, a sample-adaptive offset (SAO) filter, or another filter such as a bilateral filter, an adaptive loop filter (adaptive loop filter, ALF), a sharpening or smoothing filter, or a collaborative filter. Although the loop filter unit 220 is shown in FIG. 2 as an in-loop filter, in another configuration, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

An embodiment of the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 may receive the same loop filter parameter and apply the same loop filter parameter to decoding.

The decoded picture buffer (DPB) 230 may be a reference picture memory that stores reference picture data for encoding video data by the encoder 20. The DPB 230 may be formed by any one of a variety of memory devices, such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, the previously reconstructed and filtered block 221, of the same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the image block 203 (a current image block 203 of the current picture 201) and reconstructed picture data, for example, reference samples of a same (current) picture from the buffer 216 and/or reference picture data 231 of one or more previously decoded pictures from the decoded picture buffer 230; and process such data for prediction, that is, provide the prediction block 265 that may be an inter prediction block 245 or an intra prediction block 255.

The mode selection unit 262 may be configured to select a prediction mode (for example, an intra prediction mode or an inter prediction mode) and/or a corresponding prediction block 245 or 255 to be used as the prediction block 265, to calculate the residual block 205 and reconstruct the reconstructed block 215.

An embodiment of the mode selection unit 262 may be configured to select the prediction mode (for example, from prediction modes supported by the prediction processing unit 260), where the prediction mode provides an optimal match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate distortion optimization (RDO), that is, select a prediction mode that provides minimum rate distortion optimization or select a prediction mode for which related rate distortion at least satisfies a prediction mode selection criterion.

The prediction processing unit 260 may be further configured to partition the image block 203 into smaller block partitions or sub-blocks, for example, by iteratively using quad-tree (QT) partitioning, binary-tree (BT) partitioning, triple-tree (TI) partitioning, or any combination thereof, and to perform, for example, prediction on each of the block partitions or sub-blocks, where mode selection includes selection of a tree structure of the partitioned image block 203 and selection of a prediction mode applied to each of the block partitions or sub-blocks.

The inter prediction unit 244 may include a motion estimation (ME) unit (not shown in FIG. 2) and a motion compensation (MC) unit (not shown in FIG. 2). The motion estimation unit is configured to receive or obtain the picture image block 203 (the current picture image block 203 of the current picture 201) and a decoded picture 231, or at least one or more previously reconstructed blocks, for example, a reconstructed block or reconstructed blocks of one or more other/different previously decoded pictures 231, for motion estimation. For example, a video sequence may include the current picture and a previously decoded picture 31. In other words, the current picture and the previously decoded picture 31 may be a part of or form a sequence of pictures forming a video sequence.

For example, the encoder 20 may be configured to select a reference block from a plurality of reference blocks of a same picture or different pictures of a plurality of other pictures and provide, to the motion estimation unit (not shown in FIG. 2), a reference picture and/or provide an offset (a spatial offset) between a position (coordinates X and Y) of the reference block and a position of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolations for sub-sample precision). Interpolation filtering may generate an additional sample from a known sample, thereby potentially increasing a quantity of candidate prediction blocks that may be used to code a picture block. Upon receiving a motion vector for a PU of the current picture block, the motion compensation unit 246 may locate a prediction block to which the motion vector points in one reference picture list. The motion compensation unit 246 may further generate syntax elements associated with a block and a video slice, for decoding a picture block of the video slice by the decoder 30.

The intra prediction unit 254 is configured to obtain the picture image block 203 (the current picture block) and one or more previously reconstructed blocks, for example, reconstructed neighboring blocks, of a same picture for intra estimation. For example, the encoder 20 may be configured to select an intra prediction mode (for example, an LM prediction mode) from a plurality of intra prediction modes.

For example, for a chroma component of an image in a video sequence, in H.265, there may be five intra prediction modes for the chroma component of the image: a planar mode, a vertical mode, a horizontal mode, a DC mode, and a derived mode (DM). In a next-generation video coding standard (for example, H.266), the intra prediction modes for the chroma component of the image further includes a cross component prediction (CCP) mode, where the cross component prediction (CCP) mode is also referred to as a cross component intra prediction mode (CCIP), or a cross component linear mode (CCLM) prediction mode. The CCLM prediction mode may also be briefly referred to as a linear model mode (LM mode for short). The LM mode is a chroma intra prediction method using a texture correlation between luma and chroma.

For another example, for a luma component of an image in a video sequence, there are a total of 35 intra prediction modes for the luma component in H.265, where the 35 intra prediction modes include 33 directional prediction modes, a DC prediction mode, and a planar prediction mode. The directional prediction mode refers to mapping, in a specific direction (using an intra mode index flag), a reference sample to a position of a sample in a current block to obtain a prediction value of a current sample, or reversely mapping, in a specific direction (using an intra mode index flag), a position of each sample in a current block to a reference sample, where a sample value of the corresponding reference sample is the prediction value of the current sample. Different from the directional prediction mode, the DC prediction mode uses a mean of reference samples as a prediction value of a sample in a current block, and the planar mode uses sample values of reference samples on the top and the left of a current sample and sample values of reference samples on the top right and the bottom left of the current block to jointly derive a prediction value of the current sample.

The intra prediction unit 254 is further configured to determine the intra prediction block 255 based on, for example, an intra prediction parameter of the selected intra prediction mode. In any case, after selecting an intra prediction mode for a block, the intra prediction unit 254 is further configured to provide an intra prediction parameter, that is, information indicating the selected intra prediction mode for the block, to the entropy encoding unit 270.

In this embodiment of the present disclosure, the intra prediction unit 254 may further include a filter set. The filter set includes a plurality of filter types, different filter types respectively represent different luma block downsampling algorithms, and each filter type corresponds to one chroma sample position. The intra prediction unit 254 may be further configured to: determine a chroma sample position of a current video sequence; determine, based on the chroma sample position, a filter type used for current encoding; and generate indication information based on the filter type. The indication information is used to indicate a filter type used in a downsampling process of a luma image in the LM prediction mode during encoding or decoding of the current video sequence (for example, during encoding or reconstruction of the picture 201 or the image block 203). The intra prediction unit 254 is further configured to provide indication information of the filter type to the entropy encoding unit 270.

Specifically, the intra prediction unit 254 may transmit a syntax element to the entropy encoding unit 270, where the syntax element includes an intra prediction parameter (for example, indication information of an intra prediction mode, for example, the LM mode, that is selected for prediction for the current block after a plurality of intra prediction modes are traversed) and the indication information of the filter type. In a possible application scenario, if there is only one intra prediction mode, that is, there is only the LM prediction mode, the intra prediction parameter may not be carried in the syntax element. In this case, the decoder side 30 may directly use the LM prediction mode by default for decoding. In an example, the intra prediction unit 254 may be configured to perform any combination of the following inter prediction techniques.

The entropy encoding unit 270 is configured to apply (or bypass) an entropy encoding algorithm or a scheme (for example, a variable length coding (VLC) scheme, a context adaptive VLC (CAVLC) scheme, an arithmetic coding scheme, a context adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantized coefficients 209, the inter prediction parameter, the intra prediction parameter, and/or the loop filter parameter, to obtain the encoded picture data 21 that may be output through an output 272, for example, in a form of an encoded bitstream. The encoded bitstream may be transmitted to the decoder 30, or archived for later transmission or retrieval by the decoder 30. The entropy encoding unit 270 may be further configured to entropy encode another syntax element for a current video slice that is being encoded.

Other structural variations of the encoder 20 may be configured to encode a video stream. For example, a non-transform based encoder 20 may quantize a residual signal directly without the transform processing unit 206 for some blocks or frames. In another implementation, the encoder 20 may have the quantization unit 208 and the inverse quantization unit 210 that are combined into a single unit.

Specifically, in an embodiment of the present disclosure, the encoder 20 may be configured to: set a value of a filter type based on a sample position type of a chroma block; generate, based on the value, first indication information used to indicate the filter type, where the filter type corresponds to a filter in a filter set; and encode, into a bitstream, the first indication information as information in a syntax element, where the first indication information is carried in the encoded picture data 21.

In an embodiment of the present disclosure, the encoder 20 may be further configured to: select an LM mode from a plurality of intra prediction modes, and generate second indication information, where the second indication information is used to indicate the linear model mode; and encode, into the bitstream, the second indication information as information in a syntax element, where the second indication information is carried in the encoded picture data 21.

In an embodiment of the present disclosure, during construction of a prediction block, the encoder 20 may be further configured to: in the LM mode, determine, based on the first indication information, the filter that is in the filter set and that corresponds to the filter type; downsample a first luma block by using the filter, to obtain a second luma block, where the first luma block is a luma block corresponding to the current chroma block; obtain a template chroma sample and a template luma sample, where the template chroma sample includes a plurality of neighboring chroma samples of the current chroma block, and the template luma sample is obtained by downsampling a plurality of neighboring luma samples of the first luma block; obtain linear model coefficients based on the template chroma sample and the template luma sample; and obtain a prediction value of the current chroma block based on the second luma block and the linear model coefficients.

FIG. 3 is a schematic/conceptual block diagram of an example decoder 30 configured to implement an embodiment of the present disclosure. The decoder 30 is configured to receive encoded picture data 21, for example, obtained through encoding by an encoder 20, to obtain a decoded picture 231. During decoding, the decoder 30 receives video data from the encoder 20, for example, an encoded video bitstream that represents a picture block of an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the decoder 30 may perform a decoding process that is roughly inverse of the encoding process described with reference to the encoder 20 in FIG. 2.

The entropy decoding unit 304 is configured to perform entropy decoding on the encoded picture data 21 to obtain, for example, quantized coefficients 309 and/or decoded coding parameters (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The decoder 30 may receive a syntax element at a video slice level and/or a video block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may be similar to the inter prediction unit 244 in functions, and the intra prediction unit 354 may be similar to the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The decoder 30 may construct reference frame lists: a list 0 and a list 1, by using a default construction technique based on a reference picture stored in the DPB 330.

The prediction processing unit 360 is configured to determine prediction information for the video block of the current video slice by parsing the motion vector and the another syntax element, and use the prediction information to generate the prediction block for the current video block that is being decoded. For example, the prediction processing unit 360 uses some of received syntax elements to determine a prediction mode (for example, intra prediction or inter prediction) used to code the video block of the video slice, an inter prediction slice type (for example, a B slice, a P slice, or a GPB slice), construction information for one or more of the reference picture lists for the slice, a motion vector for each inter encoded video block of the slice, an inter prediction status for each inter-coded video block of the slice, and other information to decode the video block of the current video slice.

The inverse quantization unit 310 may be configured to inverse quantize (that is, dequantize) a quantized transform coefficient provided in the bitstream and decoded by the entropy decoding unit 304. An inverse quantization process may include: using a quantization parameter calculated by the encoder 20 for each video block in the video slice, to determine a quantization degree that should be applied and likewise, determine an inverse quantization degree that should be applied.

The inverse transform processing unit 312 is configured to apply an inverse transform (for example, an inverse DCT, an inverse integer transform, or a conceptually similar inverse transform process) to the transform coefficient to generate a residual block in a sample domain.

The reconstruction unit 314 (for example, the summer 314) is configured to add an inverse transform block 313 (that is, a reconstructed residual block 313) to the prediction block 365 to obtain a reconstructed block 315 in a sample domain, for example, by adding a sample value of the reconstructed residual block 313 and a sample value of the prediction block 365.

The loop filter unit 320 (during a coding loop or after a coding loop) is configured to filter the reconstructed block 315 to obtain a filtered block 321, to smooth sample transition or improve video quality. In an example, the loop filter unit 320 may be configured to perform any combination of filtering techniques described below. The loop filter unit 320 is intended to represent one or more loop filters including, for example, a de-blocking filter, a sample-adaptive offset (SAO) filter, or another filter such as a bilateral filter, an adaptive loop filter (ALF), a sharpening or smoothing filter, or a collaborative filter. Although the loop filter unit 320 is shown in FIG. 3 as an in-loop filter, in another configuration, the loop filter unit 320 may be implemented as a post-loop filter.

The decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Other variations of the decoder 30 may be configured to decode a compressed bitstream. For example, the decoder 30 may generate an output video stream without the loop filter unit 320. For example, a non-transform based decoder 30 may inversely quantize a residual signal directly without the inverse transform processing unit 312 for some blocks or frames. In another implementation, the decoder 30 may have the inverse quantization unit 310 and the inverse transform processing unit 312 that are combined into a single unit.

Specifically, in an embodiment of the present disclosure, the decoder 30 is configured to: parse a bitstream to obtain first indication information and second indication information, where the second indication information is used to indicate that an intra prediction mode used for decoding a chroma block currently is an LM mode, and the first indication information is used to indicate a filter type; downsampling a first luma block by using a filter corresponding to the filter type, to obtain a second luma block, where the first luma block is a luma block corresponding to the current chroma block; obtain a template chroma sample and a template luma sample, where the template chroma sample includes a plurality of neighboring chroma samples of the current chroma block, and the template luma sample is obtained by downsampling a plurality of neighboring luma samples of the first luma block; obtain linear model coefficients based on the template chroma sample and the template luma sample; and obtain a prediction value of the current chroma block based on the second luma block and the linear model coefficients.

Figure 4:
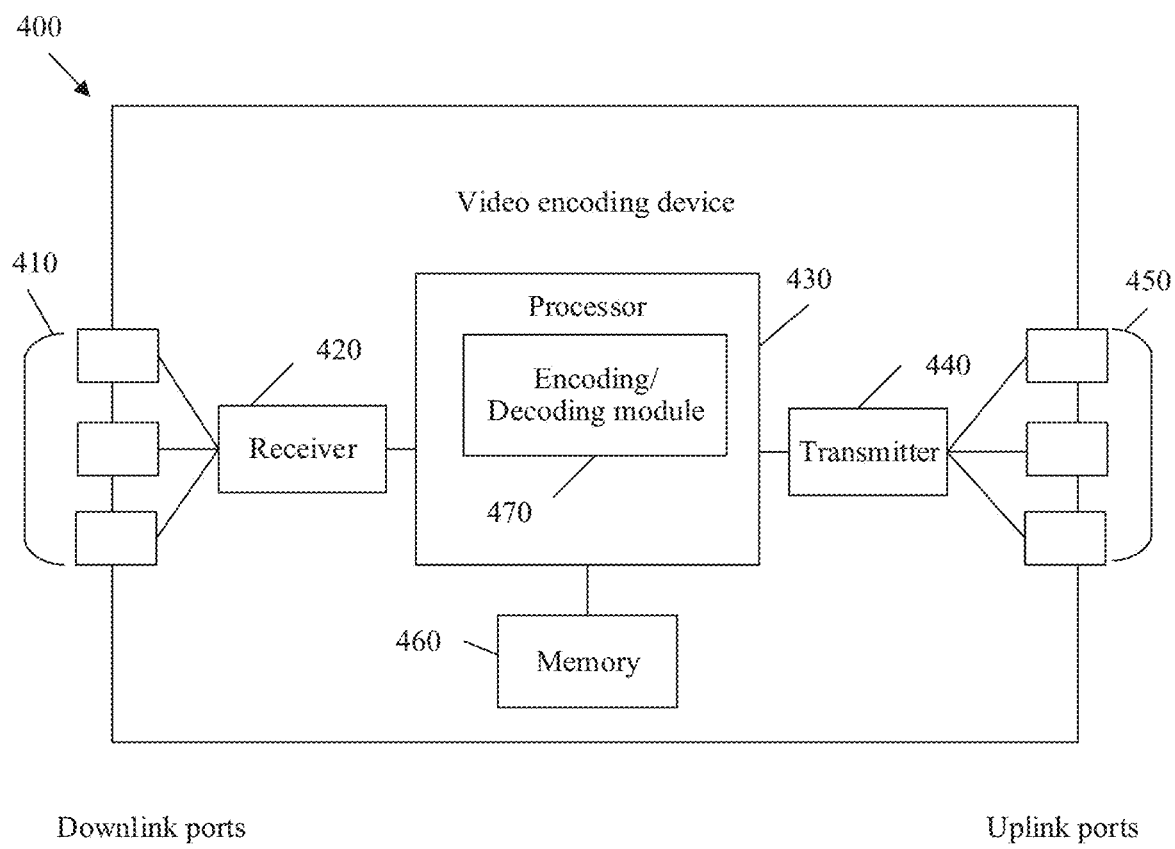
FIG. 4 is a block diagram of an example encoding apparatus or an example decoding apparatus.

FIG. 4 is a schematic structural diagram of a video coding device 400 (for example, a video encoding device 400 or a video decoding device 400) according to an embodiment of the present disclosure. The video coding device 400 is suitable for implementing an embodiment described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver unit (Rx) 420 that are configured to receive data; a processor, a logic unit, or a central processing unit (CPU) 430 that is configured to process data; a transmitter unit (Tx) 440 and egress ports 450 that are configured to transmit data; and a memory 460 configured to store data. The video coding device 400 may further include an optical-to-electrical component and an electrical-to-optical (EO) component that are coupled to the ingress ports 410, the receiver unit 420, the transmitter unit 440, and the egress ports 450, for egress or ingress of an optical signal or an electrical signal.

The processor 430 is implemented by using hardware and software. The processor 430 may be implemented as one or more CPU chips, cores (for example, multi-core processors), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the chroma block prediction method provided in the embodiments of the present disclosure. For example, the encoding/decoding module 470 implements, processes, or provides various coding operations. Therefore, inclusion of the encoding/decoding module 470 provides a substantial improvement to functions of the video coding device 400 and affects switching of the video coding device 400 to a different state. Alternatively, the encoding/decoding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
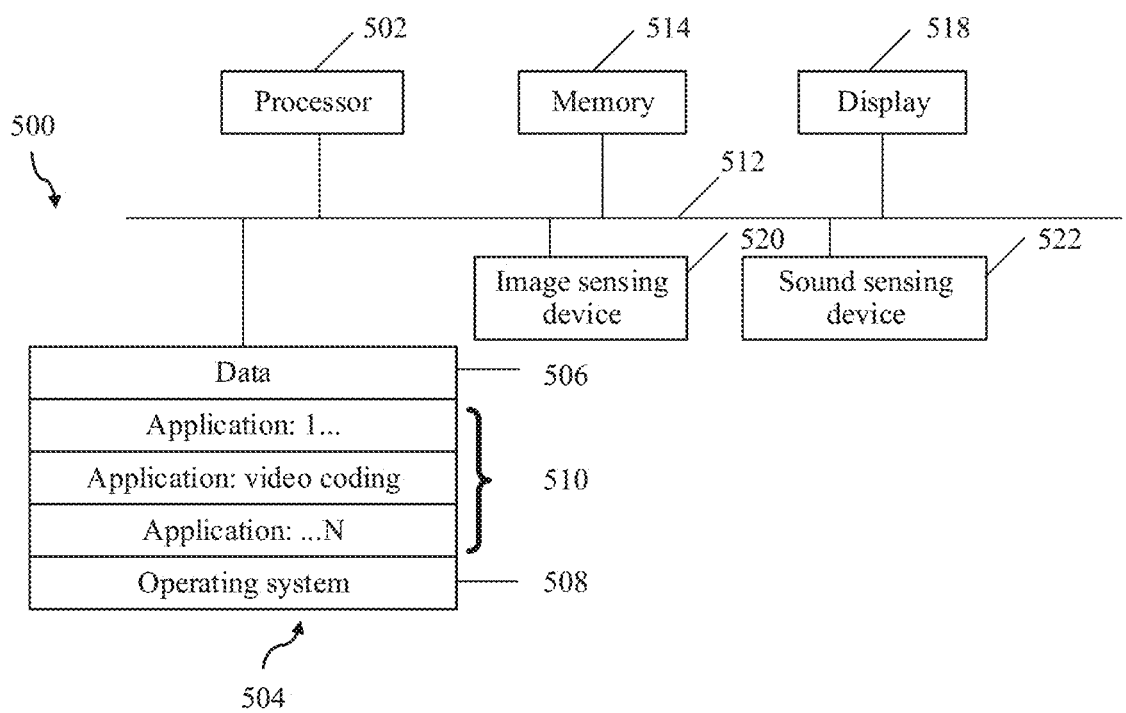
FIG. 5 is a block diagram of another example encoding apparatus or another example decoding apparatus.

FIG. 5 is simplified block diagram of an apparatus 500 that can be used as any one or two of the source device 12 and the destination device 14 in FIG. 1A according to an example embodiment. The apparatus 500 can implement the technologies in this application. The apparatus 500 for chroma block prediction may be in a form of a computing system including a plurality of computing devices, or may be in a form of a single computing device such as a mobile phone, a tablet computer, a laptop computer, or a desktop computer.

A processor 502 in the apparatus 500 may be a central processing unit. Alternatively, the processor 502 may be any other type of one or more existing/future-developed devices capable of controlling or processing information. As shown in the figure, although the disclosed implementations can be practiced by using a single processor such as the processor 502, advantages in speed and efficiency can be achieved by using more than one processor.

In an implementation, a memory 504 in the apparatus 500 may be a read only memory (ROM) device or a random access memory (RAM) device. Any other appropriate type of storage device can be used as the memory 504. The memory 504 may include code and data 506 that is accessed by the processor 502 through a bus 512. The memory 504 may further include an operating system 508 and application programs 510. The application programs 510 include at least one program that allows the processor 502 to perform the methods described in this specification. For example, the application programs 510 may include applications 1 to N, and the applications 1 to N further include a video coding application that performs the method described in this specification. The apparatus 500 may further include an additional memory in a form of a secondary memory 514. The secondary memory 514 may be, for example, a memory card used together with a mobile computing device. Because a video communication session may contain a large amount of information, all or some of the information may be stored in the secondary memory 514 and loaded, as required, into the memory 504 for processing.

The apparatus 500 may further include one or more output devices, for example, a display 518. In an example, the display 518 may be a touch-sensitive display that combines a display and a touch-sensitive element that operably senses touch input. The display 518 may be coupled to the processor 502 through the bus 512. Another output device that allows a user to program the apparatus 500 or use the apparatus 500 in another manner may be provided in addition to or as an alternative to the display 518. When the output device is or includes a display, the display may be implemented in various ways, including by using a liquid crystal display (LCD), a cathode-ray tube (CRT) display, a plasma display, or a light emitting diode (LED) display such as an organic LED (OLED) display.

The apparatus 500 may further include an image sensing device 520 or be in communication with an image sensing device 520. The image sensing device 520 is, for example, a camera or any other existing/future-developed image sensing device 520 capable of sensing an image. The image is, for example, an image of a user that runs the apparatus 500. The image sensing device 520 may be placed to directly face the user that runs the apparatus 500. In an example, a position and an optical axis of the image sensing device 520 may be configured, so that a field of view of the image sensing device 520 includes a region neighboring to the display 518 and the display 518 is visible from the region.

The apparatus 500 may further include a sound sensing device 522 or be in communication with a sound sensing device 522. The sound sensing device 522 is, for example, a microphone or any other existing/future-developed sound sensing device capable of sending sound near the apparatus 500. The sound sensing device 522 may be placed directly to face the user that runs the apparatus 500, and may be configured to receive sound, for example, a voice or other sound, made when the user runs the apparatus 500.

Although FIG. 5 depicts the processor 502 and the memory 504 of the apparatus 500 as being integrated into a single unit, there may be another configuration. Implementation of the processor 502 may be distributed in a plurality of machines (each machine has one or more processors) that can be directly coupled to each other, or distributed in a local region or another network. The memory 504 may be distributed across a plurality of machines, for example, the memory 504 is a network-based memory or a memory in a plurality of machines in which the apparatus 500 runs. Although only a single bus is depicted herein, the bus 512 of the apparatus 500 may include a plurality of buses. Further, the secondary memory 514 may be directly coupled to other components of the apparatus 500 or can be accessed via a network. The secondary memory 514 may include a single integrated unit such as a memory card or a plurality of units such as a plurality of memory cards. Therefore, the apparatus 500 can be implemented in a wide variety of configurations.

To better understand the technical solutions in the embodiments of the present disclosure, the following further describes a YUV image (or referred to as a YCbCr image) and an LM mode for intra prediction for a chroma component in the embodiments of the present disclosure.

Figure 6:
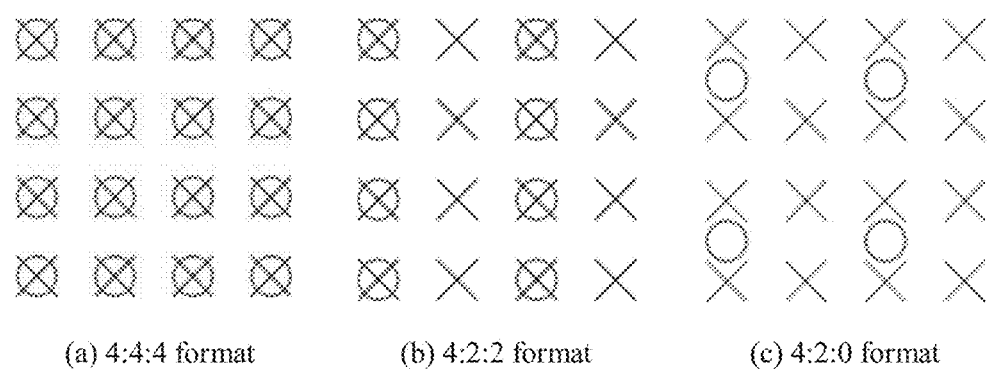
FIG. 6 is a schematic diagram of several formats of a YUV image.

An existing video is generally a color video. In addition to a luma (Y) component, the color video further includes chroma components (U, V). Therefore, such an image is also referred to as a YUV image. In this case, coding of the YUV image includes not only coding of the luma component, but also coding of the chroma components. Studies show that human eyes are more sensitive to brightness than to color. Therefore, during coding, to save a storage space and improve coding efficiency, a luma component is sampled in full resolution, and a chroma component may not be sampled in full resolution. According to different sampling methods for a luma component and chroma components in a color video, there are typically a YUV image in a 4:4:4 format, a YUV image in a 4:2:2 format, a YUV image in a 4:2:0 format, and the like in a video sequence. FIG. 6 shows examples of a 4:4:4 format, a 4:2:2 format, and a 4:2:0 format, where a cross sign (x) in the figure represents a luma component sample, and a circle sign (○) in the figure represents a chroma component sample.

The 4:4:4 format indicates that no downsampling is performed on the chroma component, and the 4:4:4 format is a format with a highest resolution of the chroma component. In other words, data in four neighboring samples includes four Y components, four U components, and four V components.

The 4:2:2 format indicates that 2:1 horizontal downsampling is performed on the chroma component relative to the luma component, and no vertical downsampling is performed. For every two U samples or every two V samples, each row includes four Y samples. In other words, data in four neighboring samples includes four Y components, two U components, and two V components.

The 4:2:0 format indicates that 2:1 horizontal downsampling and 2:1 vertical downsampling are performed on the chroma component relative to the luma component. The 4:2:0 format is a format with a lowest resolution of the chroma component, and is also a most common format. In the 4:2:0 format, a quantity of chroma samples is only half of a quantity of luma samples in each row (that is, in a horizontal direction), and is only half of a quantity of luma samples in each column (that is, in a vertical direction). When a video image uses the 4:2:0 format, if a luma component of an image block is an image block with a size of 2M*2N, a chroma component of the image block is an image block with a size of M*N. For example, if a resolution of the image block is 720*480, a resolution of the luma component of the image block is 720*480, and a resolution of the chroma component of the image block is 360*240.

For the 4:2:0 format, there may be six different chroma sample position types based on different chroma sample positions. FIG. 7 shows example relationships between a luma sample position of a luma sample and six different chroma sample position types of a chroma sample. The six different chroma sample position types are: a type0, a type1, a type2, a type3, a type4, and a type5.

In this specification, a YUV image in a 4:2:0 format is used as an example to describe the technical solutions in the embodiments of the present disclosure. In this specification, a luma component of a current to-be-processed image block may also be referred to as a luma block (or referred to as a luma block corresponding to a current chroma block, a first luma block, a luma component block, or a luma block), and a chroma component of the current to-be-processed image block may also be referred to as a current chroma block (or referred to as a chrominance block, a chroma component block, or a chroma block).

Similar to intra prediction for the luma component, intra prediction for the chroma component uses a boundary sample of a neighboring reconstructed block around the current chroma block as a reference sample of the current chroma block, maps the reference sample to a sample in the current chroma block in a specific prediction mode, and uses a value of a mapped reference sample as a prediction value of the sample in the current chroma block. A difference lies in that, a quantity of intra prediction modes for the chroma component is generally less than a quantity of intra prediction modes for the luma component because texture of the chroma component is generally relatively simple. For example, in H.265, there may be only five intra prediction modes for the chroma component: a planar mode, a vertical mode, a horizontal mode, a DC mode, and a derived mode (DM). In a next-generation video coding standard (for example, H.266), the intra prediction modes for the chroma component further include a cross component prediction (CCP) mode.

It should be understood that, in different application scenarios, the CCP mode may also be referred to as a cross component intra prediction mode (CCIP), or a cross component linear prediction mode (CCLM), or briefly referred to as a linear model mode (LM mode). The LM mode is used as an example for description in this specification.

The LM mode is a chroma intra prediction method using a texture correlation between luma and chroma. The LM mode uses a reconstructed luma component to derive a prediction value of the current chroma block based on a linear model, thereby providing a more accurate prediction value for the chroma component. The LM mode may be expressed in the following formula:

$$pred_C(i,j)=\alpha*rec_L'(i,j)+\beta$$

$\alpha$ and $\beta$ represent linear model coefficients; $pred_C(i, j)$ represents a prediction value of a chroma sample at a position (i, j); and $rec_L'(i, j)$ represents a value of a reconstructed luma sample at the position (i, j) obtained after the luma block corresponding to the current chroma block is downsampled to a resolution of the chroma component. For a video sequence in a 4:2:0 format, a resolution of a luma component is four times a resolution of a chroma component. To obtain a luma block with a same resolution as the chroma block, the luma component, before being used, needs to be downsampled to the resolution of the chroma component by using a same downsampling method of the chroma component.

Figure 8:
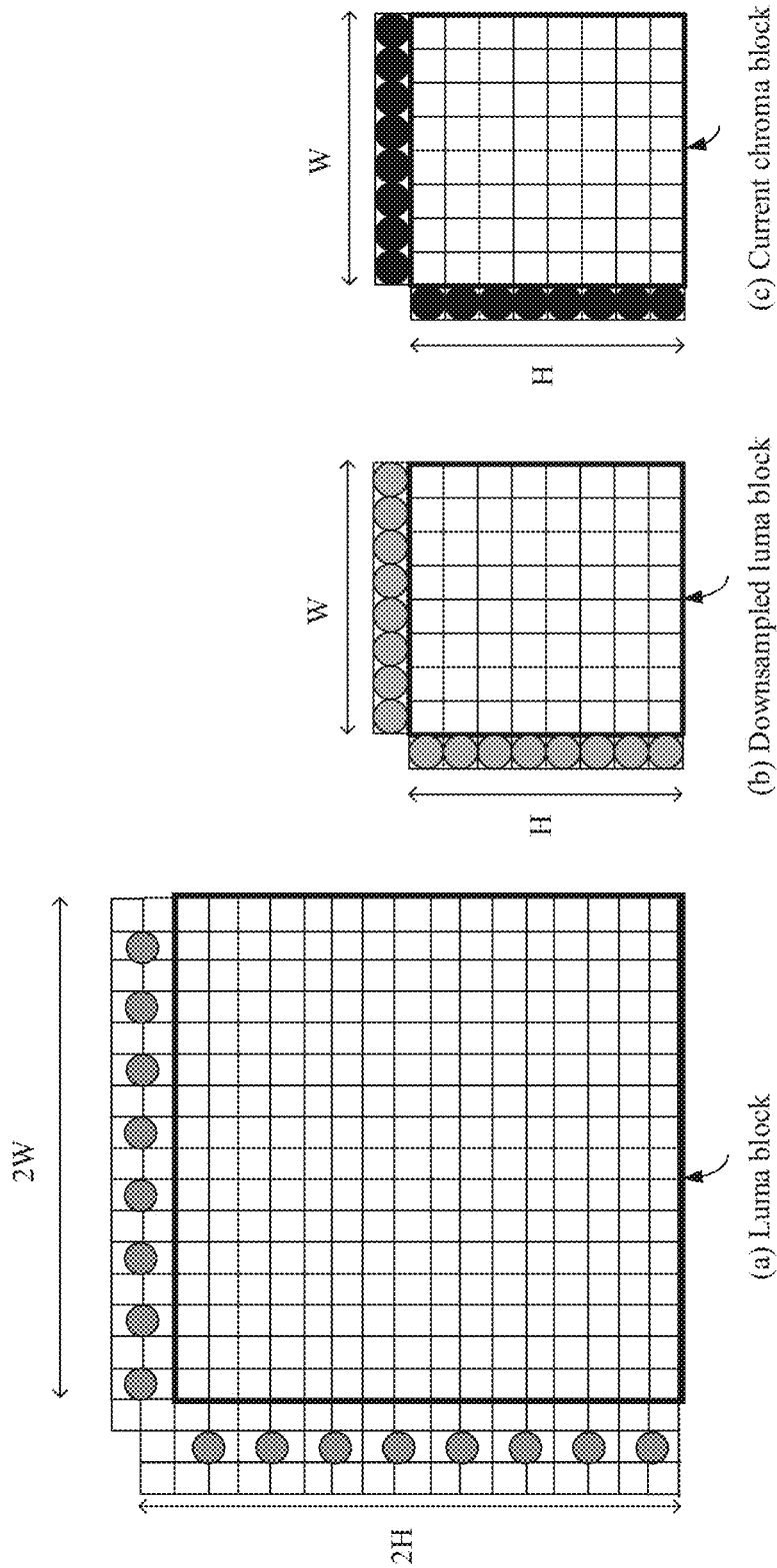
FIG. 8 shows an embodiment of a luma block, a downsampled luma block, and a current chroma block.

FIG. 8 is used as an example. FIG. 8 shows, in a YUV image in a 4:2:0 format, a luma block (that is, a luma component of an image block) corresponding to a current chroma block and neighboring top reference samples and neighboring left reference samples of the luma block, a downsampled luma block (that is, a downsampled luma component of the image block, or referred to as a second luma block) and neighboring top reconstructed reference samples and neighboring left reconstructed reference samples of the downsampled luma block, and the current chroma block (that is, a chroma component of the image block) and neighboring top reconstructed reference samples and neighboring left reconstructed reference samples of the current chroma block. A resolution of the luma block corresponding to the current chroma block is 2 W*2H, a resolution of the downsampled luma block is W*H, and a resolution of the current chroma block is W*H. In other words, the luma block and the neighboring reference sample of the luma block are downsampled to the resolution of the chroma component, so that the downsampled luma block can be obtained. There is a one-to-one correspondence between the neighboring reference sample of the downsampled luma block and the neighboring reference sample of the current chroma block.

Figure 9:
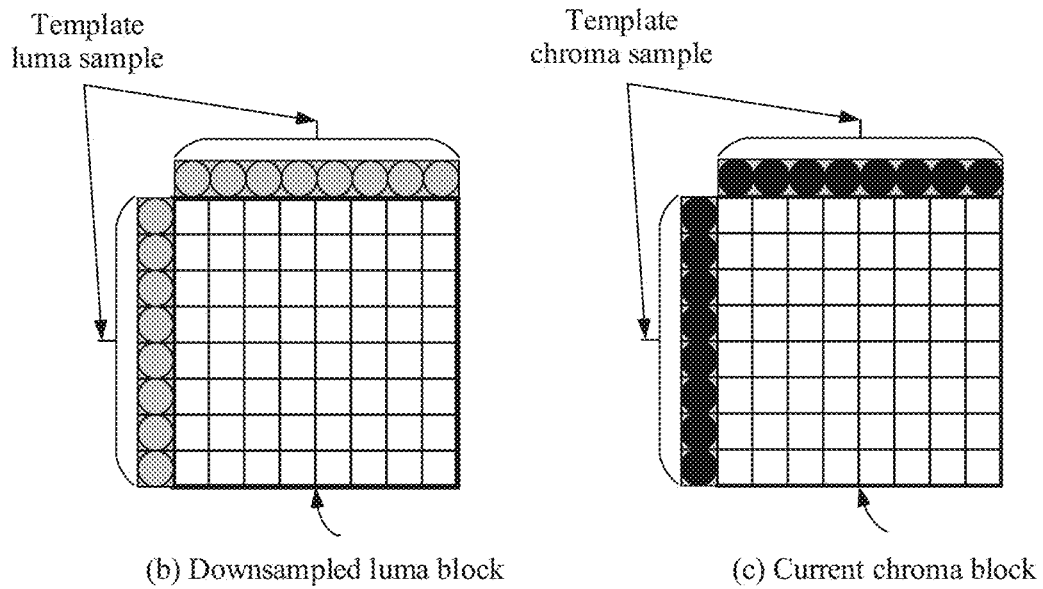
FIG. 9 shows an embodiment of a template luma sample and a template chroma sample.
Figure 10:
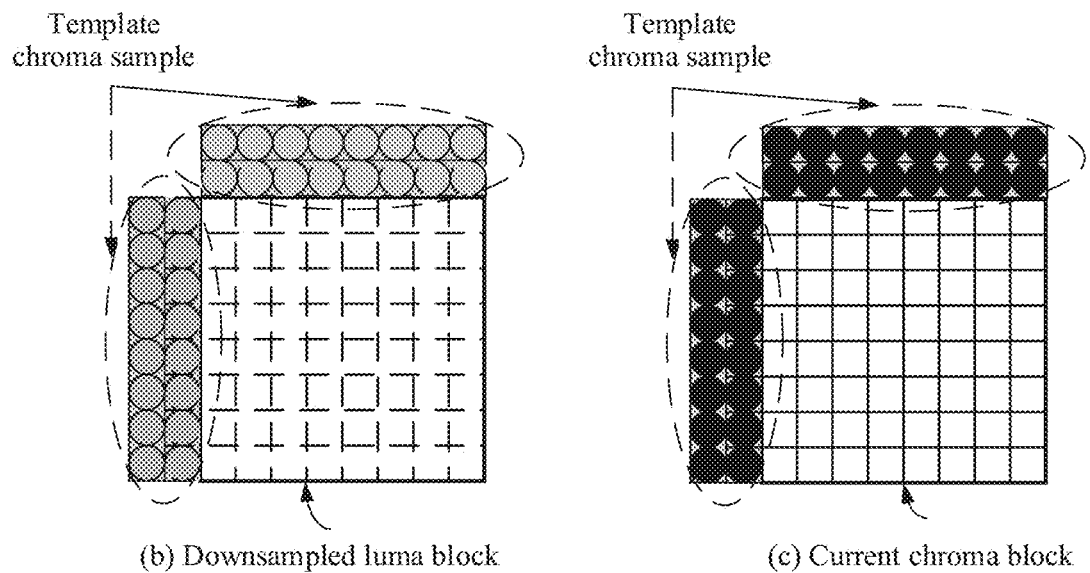
FIG. 10 shows another embodiment of a template luma sample and a template chroma sample.

Refer to FIG. 9 and FIG. 10. In this embodiment of the present disclosure, for ease of understanding, a neighboring top side and a neighboring left side that are used for calculation of the linear model coefficients may be referred to as templates. The template is a set of luma samples or a set of chroma samples used for calculation of the linear model coefficients. The set of luma samples used for calculation of the linear model coefficients may also be referred to as a template luma sample. The template luma sample is obtained by performing a downsampling operation on a plurality of neighboring luma samples of the luma block (because in a luma image, there may be no luma sample value at a position corresponding to a template chroma sample). The set of chroma samples used for calculation of the linear model coefficients may also be referred to as the template chroma sample. The template chroma sample includes a plurality of neighboring reconstructed chroma samples of the current chroma block.

In a possible embodiment, the template chroma sample specifically includes one or more rows of neighboring top chroma samples of the current chroma block, and one or more columns of neighboring left chroma samples of the current chroma block. The template luma sample one-to-one corresponds to the template chroma sample, and a value of a sample in the template luma sample and a value of a sample in the template chroma sample constitute a value pair.

For example, in FIG. 9, the template chroma sample includes one row of neighboring top chroma samples and one column of neighboring left chroma samples of the current chroma block. Accordingly, the template luma sample includes one row of luma samples and one column of left luma samples, where the one row of luma samples and the one column of left luma samples correspond to chroma sample positions in the template chroma sample.

For example, as shown in FIG. 10, in an example, the template chroma sample includes two rows of neighboring top chroma samples and two columns of neighboring left chroma samples of the current chroma block. Accordingly, the template luma sample includes two rows of luma samples and two columns of luma samples, where the two rows of luma samples and the two columns of luma samples correspond to chroma sample positions in the template chroma sample.

Certainly, there may be various specific implementations of the template chroma sample and the template luma sample. In another example, the template chroma sample may include only one or more columns of neighboring left chroma samples of the current chroma block. The template luma sample includes only one or more columns of luma samples, and template luma samples one-to-one correspond to template chroma samples. In still another example, the template chroma sample may alternatively include only one or more rows of neighboring top chroma samples of the current chroma block. The template luma sample includes only one or more rows of luma samples, and template luma samples one-to-one correspond to template chroma samples.

As described above, the template luma sample is obtained by performing a downsampling operation on a plurality of neighboring luma samples of the luma block. The following describes an example of a method for performing the downsampling operation on the template luma sample.

Figure 11:
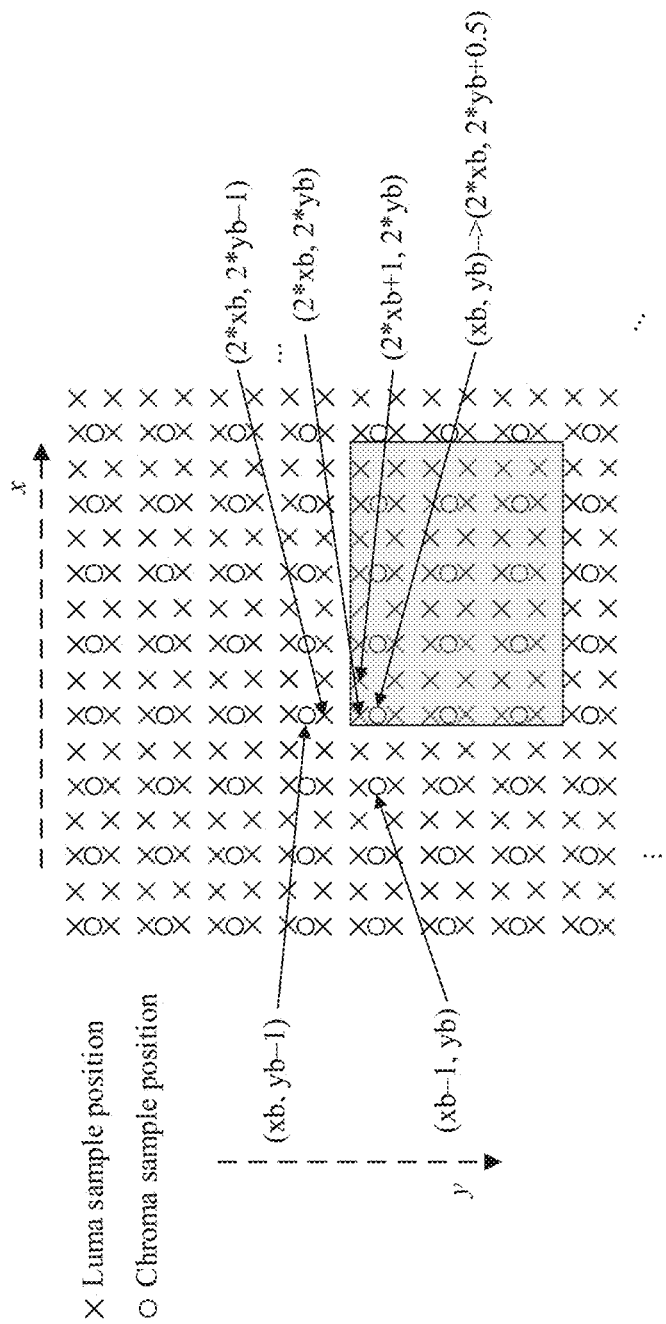
FIG. 11 is an example diagram of a relationship between some chroma sample positions and some luma sample positions.

FIG. 11 is an example diagram of a relationship between some chroma sample positions and some luma sample positions. For a YUV image in a 4:2:0 format, if the upper-left vertex of a luma image is used as the coordinate origin of a luma sample, and the upper-left vertex of a chroma image is used as the coordinate origin of a chroma sample, a sample position (xb, yb) in the chroma image that corresponds to a position in the luma image is (2*xb, 2*yb+0.5). To obtain a value of a luma sample in the template luma sample, that is, a value of a luma sample corresponding to the sample position (xb, yb), a plurality of neighboring luma samples of the luma block may be first selected. For example, sample positions of the plurality of neighboring luma samples of the luma block are (2*xb, 2*yb), (2*xb−1, 2*yb), (2*xb+1, 2*yb), (2*xb, 2*yb+1), (2*xb−1, 2*yb+1), and (2*xb+1, 2*yb+1), a value at the position (2*xb, 2*yb+0.5) is derived based on luma sample values in the luma image that correspond to these positions, and the value is used as the value of the luma sample corresponding to the sample position (xb, yb).

For example, in an example, downsampling calculation may be performed on a plurality of luma samples according to the following formula, to obtain a value LC(xb, yb) of the luma sample, corresponding to the sample position (xb, yb), in the template luma sample:

$$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3$$

where the symbol ">>" represents moving to the right.

It may be understood that, for values of other luma samples (xb+1, yb−1), . . . , (xb+i, yb−1) . . . , and (xb−1, yb), . . . , and (xb−1, yb+j) in the template luma sample of the current block, downsampling may also be performed by using the same downsampling method.

It should be noted that, downsampling in an existing sampling method is performed based on a fixed filter. To be specific, for images in various video sequences, in an existing LM mode, a fixed downsampling filter is used regardless of a chroma sample position, but a case in which different chroma sample positions may exist in different video sequences in practice and impact caused by the different chroma sample positions to a luma downsampling filter are not considered. If a luma downsampling position is inconsistent with the chroma sample position, LM model coefficients α and β derived according to an LM model formula are inaccurate, and $rec_L'(i, j)$ and the chroma sample position are not aligned. Consequently, coding efficiency is reduced.

Figure 12:
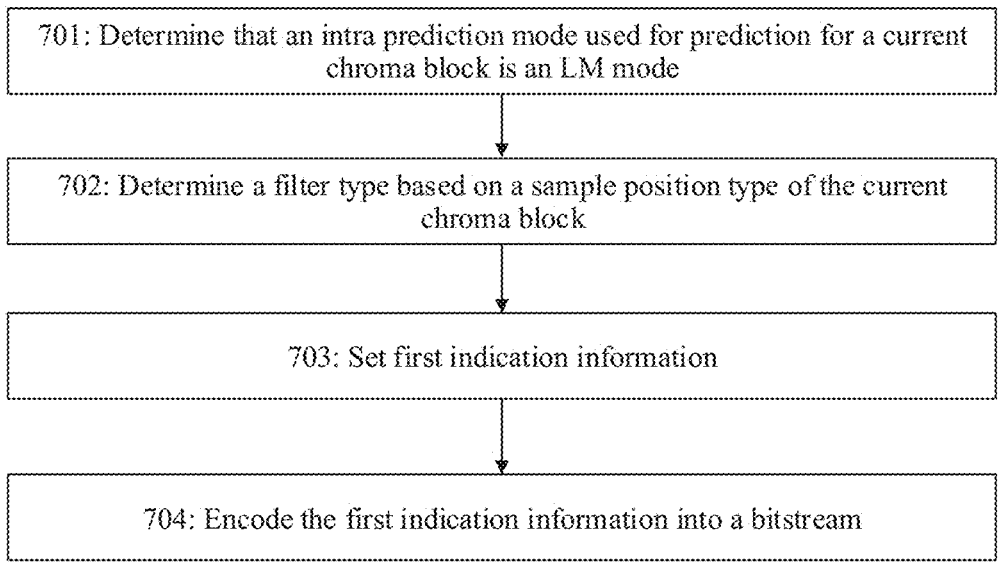
FIG. 12 is a flowchart of a chroma block prediction method according to an embodiment of the present disclosure.

To overcome the foregoing disadvantages, improve accuracy of prediction for a chroma block in an LM mode, and improve coding efficiency, an embodiment of the present disclosure provides, based on the foregoing described system and device, a chroma block prediction method used in the LM mode. First, the method is described from a perspective of an encoder side. Referring to FIG. 12, the method includes but is not limited to the following steps.

Step 701: Determine that an intra prediction mode used for prediction for a current chroma block is the LM mode.

In a specific implementation, the encoder side may preset only the LM mode for intra prediction. In other words, in this case, the encoder side directly determines that the currently used intra prediction mode is the LM mode, and then continues to perform step 702 to step 704.

In another specific implementation, the encoder side may preset a plurality of intra prediction modes, where the plurality of intra prediction modes include the LM mode; and the encoder side traverses the plurality of intra prediction modes, and determines that an optimal intra prediction mode for the current chroma block is the LM mode. In this case, the encoder side starts execution of subsequent steps such as step 702 to step 704.

In addition, the encoder side may further set second indication information, where the second indication information is used to indicate the LM mode, so that the second indication information is encoded into a bitstream in the subsequent step 704.

Step 702: Determine a filter type based on a sample position type of the current chroma block.

In other words, in a design of this embodiment of the present disclosure, when the current chroma block is predicted in the LM mode, a used luma downsampling filter is not fixed, but is determined based on the sample position type of the current chroma block. Each sample position type of the current chroma block corresponds to a filter type.

In a specific embodiment of the present disclosure, six sample position types may be designed (such a design may be referred to as a design 1). As shown in FIG. 7, the six sample position types include: a type0, a type1, a type2, a type3, a type4, and a type5. Accordingly, there are six types of luma downsampling filters corresponding to the six sample position types: a filter 0, filter 1, filter 2, filter 3, filter 4, and a filter 5. In an example, downsampling algorithms of these filters may be separately set as follows.

For the filter 0:

$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3$

For the filter 1:

$LC(xb,yb)=(L(2*xb,2*yb)+L(2*xb+1,2*yb)+L(2*xb,2*yb+1)+L(2*xb+1,2*yb+1)+2)>>2$

For the filter 2:

$LC(xb,yb)=(4*L(2*xb,2*yb)+2*L(2*xb,2*yb+1)+2*L(2*xb,2*yb-1)+2*L(2*xb-1,2*yb)+2*L(2*xb+1,2*yb)+L(2*xb+1,2*yb+1)+L(2*xb-1,2*yb+1)+L(2*xb-1,2*yb-1)+L(2*xb+1,2*yb-1)+8)>>4$

For the filter 3:

$LC(xb,yb)=(2*L(2*xb,2*yb)+2*L(2*xb+1,2*yb)+L(2*xb,2*yb-1)+L(2*xb+1,2*yb-1)+L(2*xb,2*yb+1)+L(2*xb+1,2*yb+1)+4)>>3$

For the filter 4:

$LC(xb,yb)=(4*L(2*xb,2*yb+1)+2*L(2*xb,2*yb+2)+2*L(2*xb,2*yb)+2*L(2*xb-1,2*yb+1)+2*L(2*xb+1,2*yb+1)+L(2*xb+1,2*yb+2)+L(2*xb-1,2*yb+2)+L(2*xb-1,2*yb)+L(2*xb+1,2*yb)+8)>>4$

For the filter 5:

$LC(xb,yb)=(2*L(2*xb,2*yb+1)+2*L(2*Xb+1,2*yb+1)+L(2*xb,2*yb)+L(2*xb+1,2*yb)+L(2*xb,2*yb+2)+L(2*xb+1,2*yb+2)+4)>>3$

It should be noted that the downsampling algorithms of the filters are merely examples rather than limitations.

In another specific embodiment of the present disclosure, it is considered that the chroma sample positions: the type0 and the type2, are currently most common, and two sample position types may be alternatively designed (such a design may be referred to as a design 2). In other words, the two sample position types include only the type0 and the type2. Accordingly, there are two types of luma downsampling filters, the filter 0 and the filter 2, corresponding to the two sample position types. In an example, downsampling algorithms of these filters may be separately set as follows.

For the filter 0:

$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3$

For the filter 2:

$LC(xb,yb)=(4*L(2*xb,2*yb)+2*L(2*xb,2*yb+1)+2*L(2*xb,2*yb-1)+2*L(2*xb-1,2*yb)+2*L(2*Xb+1,2*yb)+L(2*xb+1,2*yb+1)+L(2*xb-1,2*yb+1)+L(2*xb-1,2*yb-1)+L(2*xb+1,2*yb-1)+8)>>4$

It should be noted that the downsampling algorithms of the filters are merely examples rather than limitations.

It should be further noted that, in addition to the foregoing two designs, this embodiment of the present disclosure may alternatively include another design. For example, three chroma sample positions are designed and the three chroma sample positions respectively correspond to three types of filters. This is not limited herein.

In this way, the encoder side may first determine the sample position type of the current chroma block, and then determine the corresponding filter type based on the sample position type of the current chroma block, that is, determine a luma downsampling filter used for prediction for the current chroma block in the LM mode.

Step 703: Set first indication information, where the first indication information is used to indicate the filter type.

In this embodiment of the present disclosure, a sequence parameter set (SPS) parameter is newly added, and a value of the SPS parameter is used to indicate a type of a luma downsampling filter in the LM mode during encoding or decoding of a current video sequence. On the encoder side, this parameter may be set based on a chroma sample position in the current sequence. Specifically, the first indication information may be set based on the filter type. The first indication information includes the value of the SPS parameter, where the value is used to indicate the type of the luma downsampling filter used for prediction for the chroma block during encoding or decoding.

In a specific implementation of the present disclosure, a syntax element of the newly added SPS parameter may be named as "lm_mode_downsampling_filter_type_idc", where lm_mode_downsampling_filter_type_idc is used to specify a downsampling filter type in the LM mode.

For example, for the design 1 described in step 702, the six filter types are designed: the filter 0, the filter 1, the filter 2, the filter 3, the filter 4, and the filter 5. In this case, the sequence parameter set may be designed as follows:

| | Descriptor |
|---|---|
| seq_parameter_set_rbsp( ) { | |
| ... | |
|    lm_mode_downsampling_filter_type_idc | u(v) |
| ... | |
| } | |

A value of lm_mode_downsampling_filter_type_idc ranges from 0 to 5, and different values correspond to different filters. For example, the value 0 corresponds to the filter 0, the value 1 corresponds to the filter 1, the value 2 corresponds to the filter 2, the value 3 corresponds to the filter 3, the value 4 corresponds to the filter 4, and the value 5 corresponds to the filter 5. Certainly, the foregoing setting of the values and the correspondence between each value and the filter are merely examples rather than limitations.

For another example, for the design 2 described in step 702, the two filter types are designed: the filter 0 and the filter 2. In this case, the sequence parameter set may be designed as follows:

| | Descriptor |
|---|---|
| seq_parameter_set_rbsp( ) { | |
| ... | |
|    lm_mode_downsampling_filter_type_idc | u(1) |
| ... | |
| } | |

A value of lm_mode_downsampling_filter_type_idc may be 0 or 1, and different values correspond to different filters. For example, the value 0 corresponds to the filter 0 and the value 1 corresponds to the filter 2. Certainly, the foregoing setting of the values and the correspondence between each value and the filter are merely examples rather than limitations.

Step 704: Encode the first indication information into the bitstream, and send the bitstream to a decoder side. In a specific implementation, the second indication information that is set in the foregoing step 701 may be further encoded into the bitstream, and then the bitstream is sent to the decoder side. The second indication information is used to indicate the LM mode, so that the decoder side is indicated to use the LM mode.

It should be noted that the foregoing embodiment describes only that the encoder side implements an encoding process and a bitstream sending process. According to the foregoing descriptions, a person skilled in the art understands that the encoder side may further implement another method described in the embodiments of the present disclosure in another procedure. For example, in chroma block prediction, for a specific implementation of reconstruction of a chroma block performed by the encoder side, refer to a related method described from a perspective of the decoder side in the following. Details are not described herein.

It can be learned that in this embodiment of the present disclosure, for the LM mode, the encoder may determine, based on the sample position type of the current chroma sample, the luma downsampling filter used for the current luma block, and specify the type of the downsampling filter for the decoder through indication information (for example, the value of the newly added SPS parameter). This ensures that both the encoder side and the decoder side can obtain the filter corresponding to the chroma sample position. This considers a case in which different chroma sample positions may exist in different video sequences in reality, thereby ensuring consistency between a downsampled luma sample position and a chroma sample position, and improving coding accuracy and coding efficiency of the encoder side.

Figure 13:
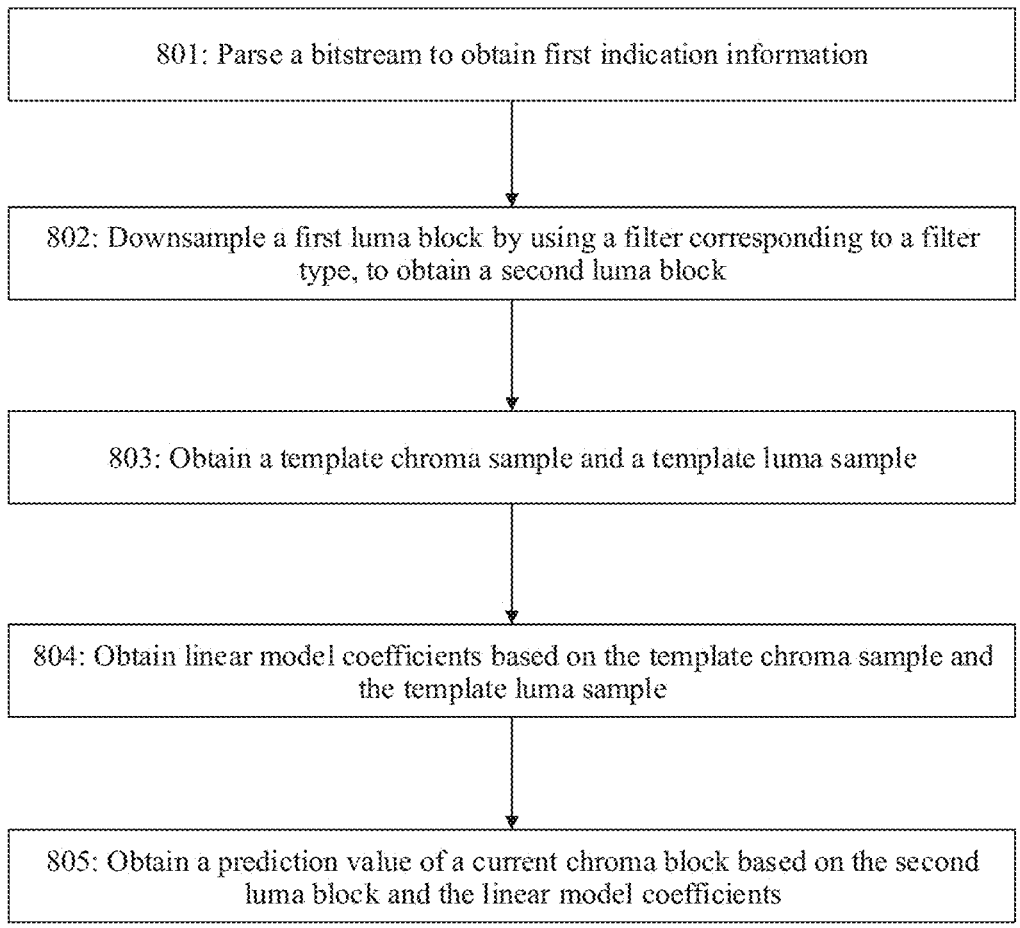
FIG. 13 is a flowchart of another chroma block prediction method according to an embodiment of the present disclosure.

Based on the foregoing system and device, an embodiment of the present disclosure provides another chroma block prediction method. The method is described from a perspective of a decoder side. Referring to FIG. 13, the method includes but is not limited to the following steps.

Step 801: Parse a bitstream to obtain first indication information.

Specifically, the decoder side may obtain the first indication information by parsing a sequence parameter set (SPS) parameter in the bitstream. For example, the SPS parameter in the bitstream may be specifically a newly added SPS parameter.

In an embodiment, the first indication information is used to indicate a filter type.

Specifically, the decoder side parses the bitstream transmitted from an encoder side, to obtain the first indication information that is used to indicate the filter type. For detailed content of the first indication information, refer to the descriptions in step 703 in the embodiment of FIG. 12.

The encoder side and the decoder side may use a same design of the filter type. For example, six filter types (corresponding to six chroma sample positions) are designed for the encoder side, and six filter types are also designed for the decoder side. In addition, downsampling algorithms of the six filter types of the decoder side are respectively consistent with downsampling algorithms of the six filter types of the encoder side. The six filter types are: a filter 0, a filter 1, a filter 2, a filter 3, a filter 4, and a filter 5. In this case, the first indication information received by the decoder side is used to indicate one of the six filter types. For example, when the first indication information is an SPS parameter lm_mode_downsampling_filter_type_idc, and a value of the SPS parameter is 2, it indicates that the first indication information indicates that the filter type is the filter 2.

For another example, two filter types (corresponding to two chroma sample positions) are designed for the encoder side, and two filter types are also designed for the decoder side. In addition, downsampling algorithms of the two filter types of the decoder side are respectively consistent with downsampling algorithms of the two filter types of the encoder side. The two filter types are: a filter 0 and a filter 2. In this case, the first indication information received by the decoder side is used to indicate one of the two filter types. For example, when the first indication information is an SPS parameter lm_mode_downsampling_filter_type_idc, and a value of the SPS parameter is 0, it indicates that the first indication information indicates that the filter type is the filter 0.

In another embodiment, the first indication information is used to indicate a sample position of a current chroma block, and the sample position of the current chroma block is associated with the filter type. Therefore, the decoder side may determine the filter type based on the sample position of the current chroma block.

Further, the first indication information may be specifically used to indicate a sample position type of the current chroma block, and accordingly, the sample position type of the current chroma block is associated with the filter type. Therefore, the decoder side may determine the filter type based on the sample position type of the current chroma block.

For example, two filter types (corresponding to two chroma sample positions) are designed for the encoder side, and two filter types are also designed for the decoder side. In addition, downsampling algorithms of the two filter types of the decoder side are respectively consistent with downsampling algorithms of the two filter types of the encoder side. The two filter types are: a filter 0 and a filter 2. In this case, the first indication information received by the decoder side is used to indicate one of the two chroma sample positions. For example, when the first indication information is an SPS parameter lm_mode_downsampling_filter_type_idc, and a value of the SPS parameter is 0, a first chroma sample position, for example, a type0, is indicated. Because the sample position type is associated with the filter type, the decoder side may directly determine, based on the first sample position type type0, that the filter type is the filter 0. For another example, when the value of the SPS parameter is 1, a second chroma sample position, for example, the type2, is indicated. Because the sample position type is associated with the filter type, the decoder side may directly determine, based on the second sample position type type2, that the filter type is the filter 2.

In addition, in a specific embodiment, during parsing of the bitstream, second indication information may be further obtained by parsing the bitstream. The second indication information is used to indicate that an intra prediction mode used by the decoder side to decode the current chroma block is an LM mode, so that the decoder side determines to use the LM mode for intra prediction for a current image in a video sequence. Further, the decoder side continues to perform related steps 802 to 805.

Step 802: Perform a downsampling operation on a first luma block by using a filter corresponding to the filter type, to obtain a second luma block, where the first luma block is a luma block corresponding to the current chroma block.

In a specific embodiment, the filter corresponding to the first indication information may be used to downsample a luma block (that is, the first luma block) corresponding to the current chroma block of the current image, to obtain a value of each luma sample in a downsampled luma block (that is, the second luma block). In this way, $rec_L'(i, j)$ in an algorithm formula of the LM mode is obtained.

For example, if six filter types are designed for the decoder side, and a value currently indicated by the first indication information is 0, a used luma downsampling filter is a filter 0, and a sampling algorithm is as follows:

$$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3$$

In this case, the filter 0 may be used to downsample the first luma block, to obtain the value of each luma sample in the second luma block.

For another example, if two filter types (for example, a filter 0 and a filter 2) are designed for the decoder side, and a value currently indicated by the first indication information is 1, a used luma downsampling filter is the filter 2, and a sampling algorithm is as follows:

$$LC(xb,yb)=(4*L(2*xb,2*yb)+2*L(2*xb,2*yb+1)+2*L(2*xb,2*yb-1)+2*L(2*xb-1,2*yb)+2*L(2*xb+1,2*yb)+L(2*xb+1,2*yb+1)+L(2*xb-1,2*yb+1)+L(2*xb-1,2*yb-1)+L(2*xb+1,2*yb-1)+8)>>4$$

In this case, the filter 2 may be used to downsample the first luma block, to obtain the value of each luma sample in the second luma block.

Step 803: Obtain a template chroma sample and a template luma sample. The template chroma sample includes a plurality of neighboring chroma samples of the current chroma block, and the template luma sample is obtained by performing a downsampling operation on a plurality of neighboring luma samples of the first luma block. For a specific implementation of step 803, refer to the related descriptions in the embodiments in FIG. 9 and FIG. 10. For brevity of this specification, details are not described herein again.

It should be noted that step 802 and step 803 are not sequential, that is, step 802 may be performed before or after step 803, or step 802 and step 803 may be performed at the same time.

Step 804: Obtain linear model coefficients α and β based on the template chroma sample and the template luma sample.

For example, in an implementation, the linear model coefficients α and β may be calculated by using a least square method. Specifically, for example, a system of linear equations may be constructed by using a template luma sample of a downsampled luma block and a template chroma sample that are shown in FIG. 9. A quantity of neighboring reference samples of the template chroma sample or the template luma sample is denoted as N, and L(n) and C(n) respectively represent a value of an $n^{th}$ luma sample and a value of an $n^{th}$ chroma sample. In this case, the linear model coefficients α and β are as follows:

$$\alpha = \frac{N*\sum(L(n)*C(n))-\sum L(n)*\sum C(n)}{N*\sum(L(n)*L(n))-\sum L(n)*\sum L(n)}$$

$$\beta = \frac{\sum C(n)-\alpha*\sum L(n)}{N}$$

Figure 14:
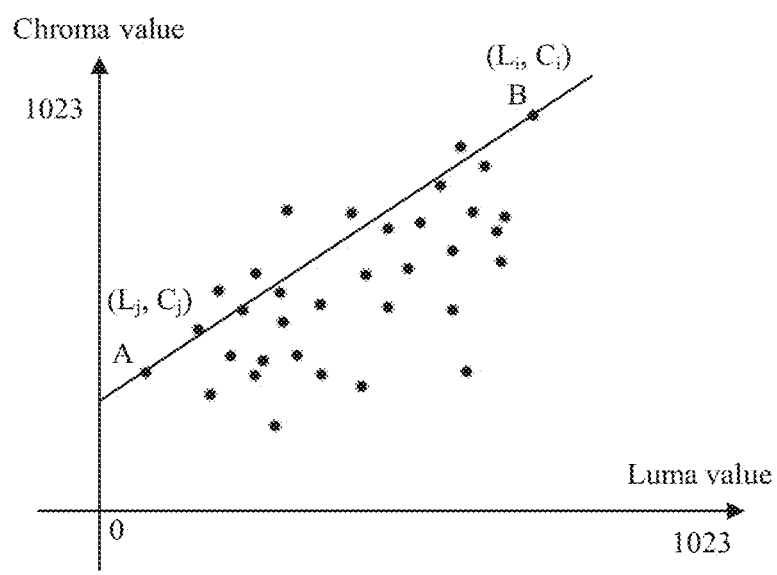
FIG. 14 is a schematic diagram of distribution of a set of sample value pairs in a luma-chroma coordinate system.

For another example, in another implementation, the linear model coefficients α and β may be calculated by using an extremum method. Specifically, a quantity of neighboring reference samples of the template chroma sample or the template luma sample is denoted as N, L(n) and C(n) respectively represent a value of an $n^{th}$ luma sample and a value of an $n^{th}$ chroma sample, and L(n) and C(n) constitute a sample value pair. A set of sample value pairs may be obtained as follows: $\{(L_0,C_0), (L_1,C_1), (L_2,C_2) \ldots (L_n,C_n) \ldots (LN-1,CN-1)\}$, where N represents a quantity of neighboring samples of the current chroma block that are used to determine the linear model coefficients. FIG. 14 shows distribution of a set of sample value pairs in a luma-chroma coordinate system. A value pair corresponding to a maximum luma value $L_{max}$ and a minimum luma value $L_{min}$ are found in the set of sample value pairs. Assuming that an $i^{th}$ sample B corresponds to the maximum luma value, that is, $L_i=L_{max}$, and that a $j^{th}$ sample A corresponds to the minimum luma value, that is, $L_j=L_{min}$, the linear model coefficients α and β are respectively:

$$\alpha = \frac{C_i - C_j}{L_i - L_j}$$

$$\beta = C_j - \alpha * L_j$$

It should be understood that the foregoing is merely an example but not a limitation. After the value of each luma sample of the template chroma sample and a value of each chroma sample of the template luma sample are obtained, a manner of deriving the linear model coefficients α and β of the LM mode based on the template chroma sample and the template luma sample is not limited in this embodiment of the present disclosure.

Step 805: Obtain a prediction value of the current chroma block based on the second luma block and the linear model coefficients.

It may be understood that, after $rec_L'(i, j)$ and the linear model coefficients α and β are obtained, according to an algorithm formula of the LM mode:

$$pred_C(i,j)=\alpha*rec_L'(i,j)+\beta,$$

a prediction value $pred_C(i, j)$ of each chroma sample in the current chroma block may be obtained.

It can be learned that in this embodiment of the present disclosure, the decoder side may determine, based on the indication information (for example, the value of the newly added SPS parameter) in the bitstream, the filter used for downsampling the luma block corresponding to the current chroma block in the LM mode. In this way, the filter corresponding to the chroma sample position can be obtained. This considers a case in which different chroma sample positions may exist in different video sequences in reality, thereby ensuring consistency between a downsampled luma sample position and a chroma sample position.

Figure 15:
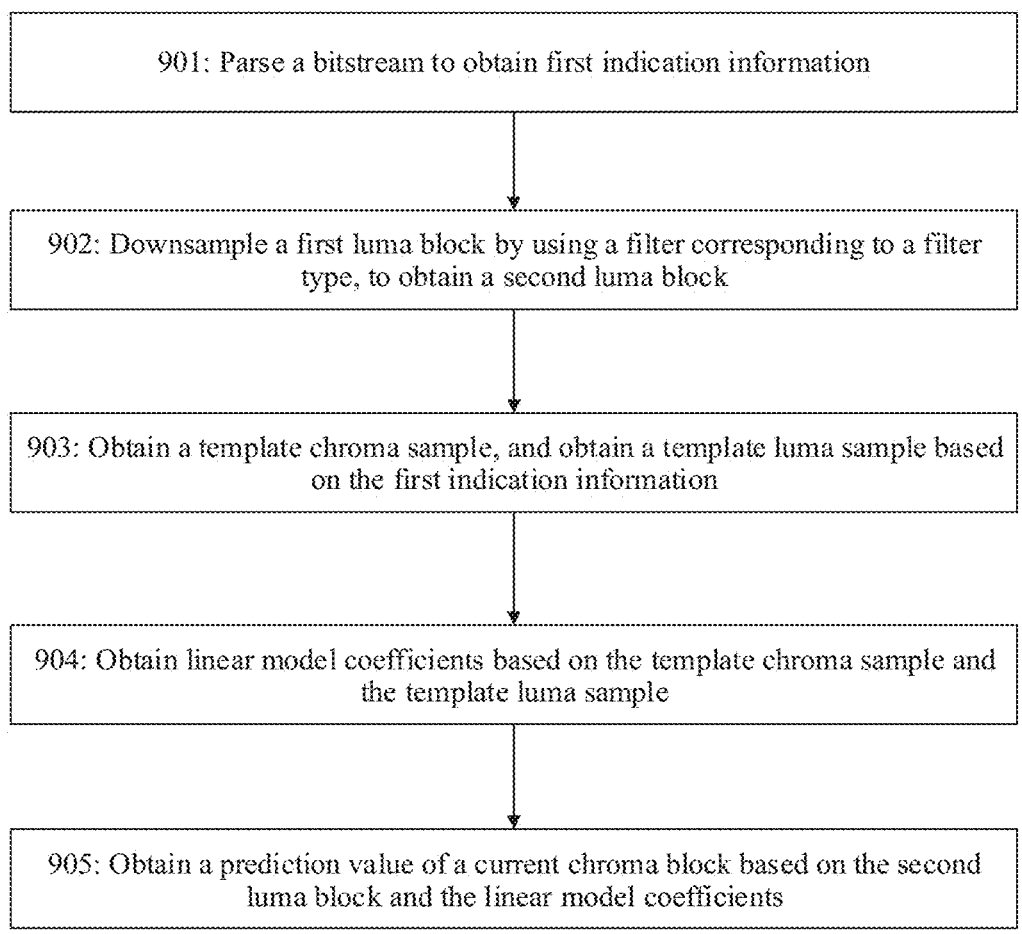
FIG. 15 is a flowchart of still another chroma block prediction method according to an embodiment of the present disclosure.

Based on the foregoing described system and device, an embodiment of the present disclosure provides still another chroma block prediction method. The method is described from a perspective of a decoder side. Refer to FIG. 15. In comparison with FIG. 13, step 903 in the embodiment of FIG. 15 is different from step 803 in the embodiment of FIG. 13. The method is briefly described as follows.

Step 901: Parse a bitstream to obtain first indication information, where the first indication information is used to indicate a filter type. For a specific implementation, refer to the description of step 801 in the embodiment of FIG. 13. Details are not described herein again.

Step 902: Perform a downsampling operation on a first luma block by using a filter corresponding to the filter type, to obtain a second luma block, where the first luma block is a luma block corresponding to a current chroma block, and the second luma block represents a set of downsampled luma samples in the first luma block. For a specific implementation, refer to the description of step 802 in the embodiment of FIG. 13. Details are not described herein again.

Step 903: Obtain a template chroma sample, and obtain a template luma sample based on the first indication information.

In this embodiment of the present disclosure, for the template luma sample, because the first indication information indicates the filter type, the downsampling operation may be performed on a plurality of neighboring luma samples of the first luma block by using the filter corresponding to the filter type, to obtain the template luma sample.

For example, if six filter types are designed for the decoder side, and a value currently indicated by the first indication information is 0, a used luma downsampling filter is a filter 0, and a sampling algorithm is as follows:

$$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3$$

In this case, the filter 0 may be used to perform the downsampling operation on the plurality of neighboring luma samples of the first luma block, to obtain a value of each luma sample in the template luma sample.

For another example, two filter types (for example, a filter 0 and a filter 2) are designed for the decoder side, and a value currently indicated by the first indication information is 1, a used luma downsampling filter is the filter 2, and a sampling algorithm is as follows:

$$LC(xb,yb)=(4*L(2*xb,2*yb)+2*L(2*xb,2*yb+1)+2*L(2*xb,2*yb-1)+2*L(2*xb-1,2*yb)+2*L(2*xb+1,2*yb)+L(2*xb+1,2*yb+1)+L(2*xb-1,2*yb+1)+L(2*xb-1,2*yb-1)+L(2*xb+1,2*yb-1)+8)>>4$$

In this case, the filter 2 may be used to perform the downsampling operation on the plurality of neighboring luma samples of the first luma block, to obtain a value of each luma sample in the template luma sample.

It should be noted that the foregoing is merely an example rather than a limitation.

In this embodiment of the present disclosure, for the template chroma sample, the template chroma sample includes a plurality of neighboring chroma samples of the current chroma block. For a specific method for obtaining the template chroma sample, refer to the related descriptions in the embodiments in FIG. 9 and FIG. 10. Details are not described herein again.

Step 904: Obtain linear model coefficients $\alpha$ and $\beta$ based on the template chroma sample and the template luma sample. For a specific implementation, refer to the description of step 804 in the embodiment of FIG. 13. Details are not described herein again.

Step 905: Obtain a prediction value of the current chroma block based on the second luma block and the linear model coefficients. For a specific implementation, refer to the description of step 805 in the embodiment of FIG. 13. Details are not described herein again.

Particularly, the following embodiments are provided herein:

Embodiment 1. A chroma block prediction method, wherein the method comprises:

parsing a bitstream to obtain first indication information, wherein the first indication information is used to indicate a filter type;

performing a downsampling operation on a first luma block by using a filter corresponding to the filter type, to obtain a second luma block, wherein the first luma block is a luma block corresponding to a current chroma block;

obtaining a template chroma sample and a template luma sample, wherein the template chroma sample comprises a plurality of neighboring chroma samples of the current chroma block, and the template luma sample is obtained by performing a downsampling operation on a plurality of neighboring luma samples of the first luma block;

obtaining linear model coefficients based on the template chroma sample and the template luma sample; and obtaining a prediction value of the current chroma block based on the second luma block and the linear model coefficients.

Embodiment 2. The method according to embodiment 1, wherein the obtaining a template luma sample comprises:

performing the downsampling operation on the plurality of neighboring luma samples of the first luma block by using the filter corresponding to the filter type, to obtain the template luma sample.

Embodiment 3. The method according to embodiment 1 or 2, wherein the template chroma sample comprises:

one or more columns of neighboring left chroma samples of the current chroma block.

Embodiment 4. The method according to embodiment 1 or 2, wherein the template chroma sample comprises:

one or more rows of neighboring top chroma samples of the current chroma block.

Embodiment 5. The method according to any one of embodiments 1 to 4, wherein the template chroma sample comprises:

the one or more rows of neighboring top chroma samples of the current chroma block, and the one or more columns of neighboring left chroma samples of the current chroma block.

Embodiment 6. The method according to any one of embodiments 1 to 5, wherein before the obtaining a template chroma sample and a template luma sample, the method further comprises:

parsing the bitstream to obtain second indication information, wherein the second indication information is used to indicate that an intra prediction mode used for current decoding is a linear model LM mode.

Embodiment 7. The method according to any one of embodiments 1 to 6, wherein the method is used for decoding a current image block in a video sequence, wherein the current image block comprises the first luma block and the current chroma block, and an image in the video sequence is in a 4:2:0 format or a 4:2:2 format.

Embodiment 8. A chroma block prediction method, wherein the method comprises:

determining a filter type based on a sample position of a current chroma block;

performing a downsampling operation on a first luma block by using a filter corresponding to the filter type, to obtain a second luma block, wherein the first luma block is a luma block corresponding to the current chroma block;

obtaining a template chroma sample and a template luma sample, wherein the template chroma sample comprises a plurality of neighboring chroma samples of the current chroma block, and the template luma sample is obtained by performing a downsampling operation on a plurality of neighboring luma samples of the first luma block;

obtaining linear model coefficients based on the template chroma sample and the template luma sample; and obtaining a prediction value of the current chroma block based on the second luma block and the linear model coefficients.

Embodiment 9. The method according to embodiment 8, wherein before the determining a filter type based on a sample position of a current chroma block, the method further comprises:

parsing a bitstream to obtain first indication information, wherein the first indication information is used to indicate the sample position of the current chroma block.

Embodiment 10. The method according to embodiment 9, wherein the parsing a bitstream to obtain first indication information comprises:

parsing a sequence parameter set (SPS) parameter in the bitstream, to obtain the first indication information.

Embodiment 11. A chroma block prediction method, wherein the method comprises: determining a filter type based on a sample position type of a current chroma block;

setting first indication information, wherein the first indication information is used to indicate the filter type; and encoding the first indication information into a bitstream.

Embodiment 12. The method according to embodiment 11, wherein the sample position type of the current chroma block is at least one of the following sample position types: a sample position type type0, a sample position type type1, a sample position type type2, a sample position type type3, a sample position type type4, and a sample position type type5.

Embodiment 13. The method according to embodiment 11, wherein the sample position type of the current chroma block is at least one of the following sample position types: a sample position type type0 and a sample position type type2.

Embodiment 14. The method according to any one of embodiments 11 to 13, wherein the method further comprises:

selecting a linear model LM mode from a plurality of intra prediction modes;

setting second indication information, wherein the second indication information is used to indicate the linear model LM mode; and encoding the second indication information into the bitstream.

Embodiment 15. The method according to any one of embodiments 11 to 14, wherein the method further comprises:

determining, based on the first indication information, a filter corresponding to the filter type;

downsampling a first luma block by using the filter corresponding to the filter type, to obtain a second luma block, wherein the first luma block is a luma block corresponding to the current chroma block;

obtaining a template chroma sample and a template luma sample, wherein the template chroma sample comprises a plurality of neighboring chroma samples of the current chroma block, and the template luma sample is obtained by downsampling a plurality of neighboring luma samples of the first luma block;

obtaining linear model coefficients based on the template chroma sample and the template luma sample; and obtaining a prediction value of the current chroma block based on the second luma block and the linear model coefficients.

It can be learned that in this embodiment of the present disclosure, for an LM mode, in a downsampling process of deriving the template luma sample and a downsampling process of the current block, the decoder side may determine, based on the indication information (for example, a value of a newly added SPS parameter) in the bitstream, the filter used for downsampling the luma block corresponding to the current chroma block in the LM mode. In this way, a filter corresponding to a chroma sample position can be obtained. This considers a case in which different chroma sample positions may exist in different video sequences in reality, thereby ensuring consistency between a downsampled luma sample position and a chroma sample position.

The following describes application of the encoding method and the decoding method described in the foregoing embodiments, and a system in which the encoding method and the decoding method are used.

Figure 16:
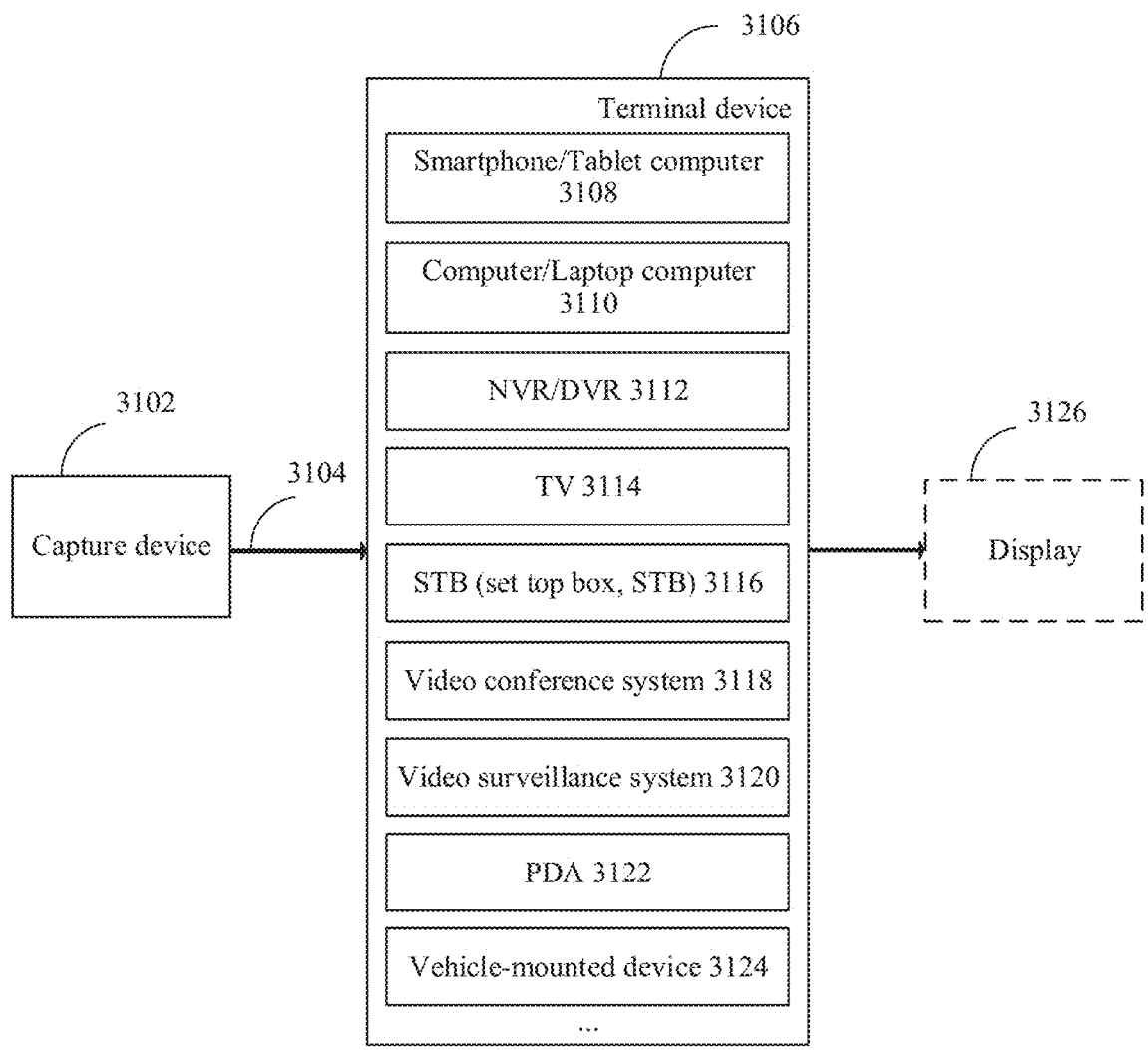
FIG. 16 is a block diagram of an example structure of a content supply system for implementing a content distribution service.

FIG. 16 is a block diagram of a content supply system 3100 for implementing a content distribution service. The content supply system 3100 includes a capture device 3102 and a terminal device 3106, and optionally, includes a display 3126. The capture device 3102 communicates with the terminal device 3106 through a communication link 3104. The communication link may include the communication channel 13 described above. The communication link 3104 includes but is not limited to Wi-Fi, the Ethernet, a cable, wireless (3G/4G/5G), a USB, any kind of combination thereof, or the like.

The capture device 3102 generates data, and may encode the data by using the encoding method as described in the foregoing embodiments. Alternatively, the capture device 3102 may distribute the data to a streaming server (not shown in the figure), and the server encodes the data and transmits encoded data to the terminal device 3106. The capture device 3102 includes but is not limited to a camera, a smartphone, a tablet computer, a computer, a notebook computer, a video conference system, a PDA, a vehicle-mounted device, a combination thereof, or the like. For example, the capture device 3102 may include the source device 12 as described above. When the data includes a video, a video encoder 20 included in the capture device 3102 may actually perform video encoding processing. When the data includes audio (for example, voice), an audio encoder included in the capture device 3102 may actually perform audio encoding processing. For some practical scenarios, the capture device 3102 distributes encoded video data and encoded audio data by multiplexing them together. For other practical scenarios, for example, in the video conference system, the encoded audio data and the encoded video data are not multiplexed. The capture device 3102 separately distributes the encoded audio data and the encoded video data to the terminal device 3106.

In the content supply system 3100, the terminal device 310 receives and reproduces the encoded data. The terminal device 3106 may be a device having data receiving and restoring capabilities, such as a smartphone or tablet computer 3108, a computer or notebook computer 3110, a network video recorder (NVR)/digital video recorder (DVR) 3112, a TV 3114, a set top box (STB) 3116, a video conference system 3118, a video surveillance system 3120, a personal digital assistant (PDA) 3122, a vehicle-mounted device 3124, or any kind of combination thereof that is capable of decoding the foregoing encoded data. For example, the terminal device 3106 may include the destination device 14 as described above. When the encoded data includes a video, a video decoder 30 included in the terminal device is prioritized to perform video decoding. When the encoded data includes audio, an audio decoder included in the terminal device is prioritized to perform audio decoding processing.

For a terminal device equipped with a display, for example, the smartphone or tablet computer 3108, the computer or notebook computer 3110, the network video recorder (NVR)/digital video recorder (DVR) 3112, the TV 3114, the personal digital assistant (PDA) 3122, or the vehicle-mounted device 3124, the terminal device may feed decoded data to the display of the terminal device. For a terminal device equipped with no display, for example, the STB 3116, the video conference system 3118, or the video surveillance system 3120, an external display 3126 is connected to receive and display decoded data.

When each device in this system performs encoding or decoding, the image encoding device or the image decoding device, as described in the foregoing described embodiments, may be used.

Figure 17:
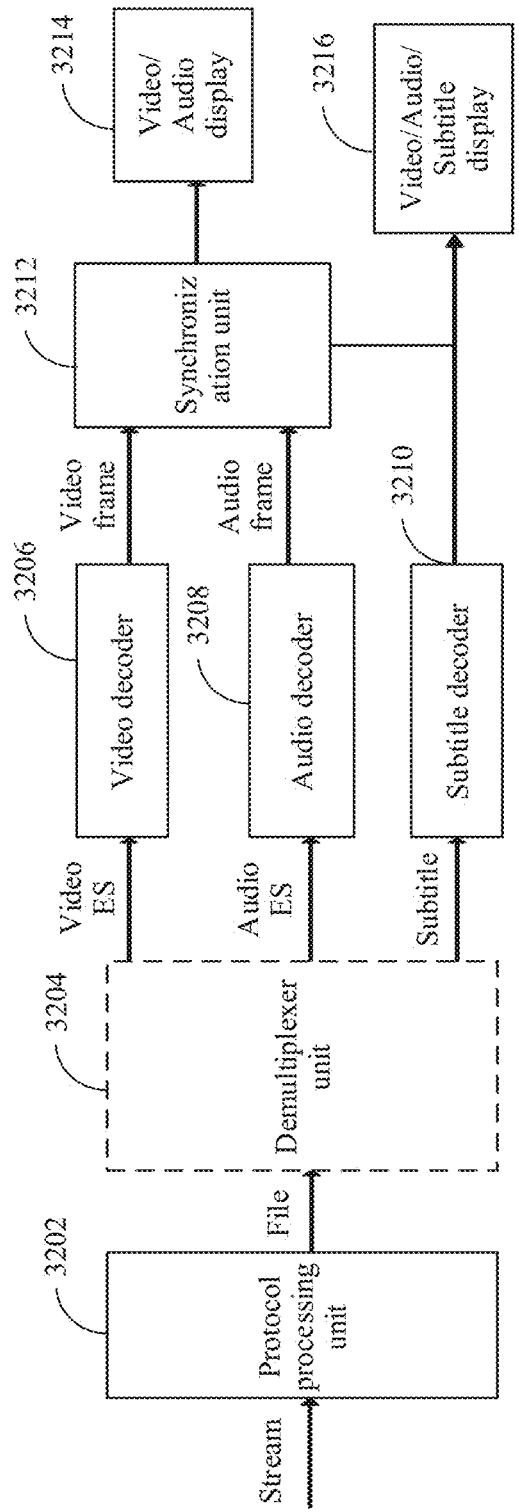
FIG. 17 is a block diagram of an example structure of a terminal device.

FIG. 17 is a diagram of an example structure of the terminal device 3106. After the terminal device 3106 receives a stream from the capture device 3102, a protocol processing unit 3202 analyzes a transmission protocol of the stream. The protocol includes but is not limited to the real time streaming protocol (RTSP), the hypertext transfer protocol (HTTP), the HTTP live streaming protocol (HLS), the MPEG-DASH, the real-time transport protocol (RTP), the real time messaging protocol (RTMP), any kind of combination thereof, or the like.

After processing the stream, the protocol proceeding unit 3202 generates a stream file. The file is output to a demultiplexer unit 3204. The demultiplexer unit 3204 may separate multiplexed data into encoded audio data and encoded video data. As described above, for other practical scenarios, for example, in a video conference system, the encoded audio data and the encoded video data are not multiplexed. In this situation, the encoded data is transmitted to a video decoder 3206 and an audio decoder 3208 without through the demultiplexer unit 3204.

A video elementary stream (ES), an audio ES, and optionally a subtitle are generated through demultiplexing processing. The video decoder 3206 includes the video decoder 30 described in the foregoing embodiment, decodes the video ES by using the decoding method shown in the foregoing embodiment to generate a video frame, and feeds the data to a synchronization unit 3212. The audio decoder 3208 decodes the audio ES to generate an audio frame, and feeds the data to the synchronization unit 3212. Alternatively, the video frame may be stored in a buffer (not shown in the figure) before the video frame is fed to the synchronization unit 3212. Similarly, the audio frame may be stored in a buffer (not shown in the figure) before the audio frame is fed to the synchronization unit 3212.

The synchronization unit 3212 synchronizes the video frame and the audio frame, and provides a video/audio to a video/audio display 3214. For example, the synchronization unit 3212 synchronizes presentation of video information and audio information. Information may be encoded in a syntax element by using time stamps concerning the presentation of encoded audio and video data and a time stamp concerning delivery of the data stream.

If the subtitle is included in the stream, a subtitle decoder 3210 decodes the subtitle, synchronizes the subtitle with the video frame and the audio frame, and provides the video/audio/subtitle to a video/audio/subtitle display 3216.

The present disclosure is not limited to the foregoing system, and the image encoding device or the image decoding device in the foregoing embodiments may be incorporated into another system, for example, a vehicle system.

All or some of the foregoing embodiments may be implemented by software, hardware, firmware, or any combination thereof. When software is used for implementation, the embodiments may be implemented completely or partially in a form of a computer program product. The computer program product includes one or more computer instructions. When the computer program instruction is loaded and executed on a computer, all or some of the procedures or functions are generated according to the embodiments of the present disclosure. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the descriptions in the embodiments have respective focuses. For a part that is not described in detail in an embodiment, refer to related descriptions in other embodiments.

What is claimed is:
1. A method comprising:
parsing a bitstream to obtain first indication information;
performing a first downsampling operation on a first luma block using a first filter when a value of the first indication information is a first value, or using a second filter when a value of the first indication information is a second value, to obtain a second luma block, wherein the first luma block corresponds to a current chroma block, and wherein the value of the first indication information is the first value when a sample position of the current chroma block has an inconsistency with a sample position of the first luma block in a vertical direction, and a value of the inconsistency is 0.5;
obtaining a plurality of chroma samples and a plurality of luma samples, wherein the plurality of chroma samples comprise a plurality of neighboring chroma samples of the current chroma block, and the plurality of luma samples are obtained by performing a second downsampling operation on a plurality of neighboring luma samples of the first luma block;
obtaining linear model coefficients based on the plurality of chroma samples and the plurality of luma samples; and
obtaining a prediction value of the current chroma block based on the second luma block and the linear model coefficients.

2. The method according to claim 1, wherein obtaining the plurality of luma samples comprises:
performing the second downsampling operation on the plurality of neighboring luma samples of the first luma block using the first filter when the value of the first indication information is the first value, or using the second filter when the value of the first indication information is the second value, to obtain the plurality of luma samples.

3. The method according to claim 1, wherein before obtaining the plurality of chroma samples and the plurality of luma samples, the method further comprises:
parsing the bitstream to obtain second indication information, wherein the second indication information indicates that an intra prediction mode used for current decoding is a linear model (LM) mode.

4. The method according to claim 1, wherein the first luma block and the current chroma block are included in an image block of a video sequence, and an image in the video sequence is in a 4:2:0 format or a 4:2:2 format.

5. The method according to claim 1, wherein parsing the bitstream to obtain the first indication information comprises:
parsing a sequence parameter set (SPS) parameter in the bitstream, to obtain the first indication information.

6. The method according to claim 5, wherein when the value of the SPS parameter is 0, the first filter is used for performing the first downsampling operation; and when the value of the SPS parameter is 1, the second filter is used for performing the first downsampling operation.

7. The method according to claim 1, wherein the first filter is a filter 0 represented as:

$$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3,$$

wherein LC(xb,yb) represents a value of the second luma block corresponding to a sample position (xb, yb) of the current chroma block, and L(,) represents a value of a luma sample of the first luma block.

8. A method comprising:
determining, based on a sample position type of a sample position of a current chroma block, a filter type of a filter to be used for downsampling a first luma block corresponding to the current chroma block, wherein the filter type is a first type when the sample position of the current chroma block has an inconsistency with a sample position of the first luma block in a vertical direction, and a value of the inconsistency is 0.5;
setting first indication information to a first value when the filter type is the first type or setting the first indication information to a second value when the filter type is a second type; and
encoding the first indication information into a bitstream.

9. The method according to claim 8, wherein the sample position type is a sample position type type0 or a sample position type type2.

10. The method according to claim 8, wherein the method further comprises:
selecting a linear model (LM) mode from a plurality of intra prediction modes;
setting second indication information to indicate the LM mode; and
encoding the second indication information into the bitstream.

11. The method according to claim 8, wherein the first type is a filter 0 represented as:

$$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3,$$

wherein LC(xb,yb) represents a value, of a second luma block, corresponding to a sample position (xb, yb) of the current chroma block, and L(,) represents a value of a luma sample of the first luma block.

12. The method according to claim 8, wherein encoding the first indication information into the bitstream comprises:
encoding the first indication information into a sequence parameter set (SPS) parameter in the bitstream.

13. The method according to claim 8, wherein the current chroma block is included in an image block of a video sequence, and an image in the video sequence is in a 4:2:0 format or a 4:2:2 format.

14. A non-transitory storage medium comprising the bitstream encoded by the method of claim 8.

15. A decoding device, comprising:
a non-transitory computer-readable storage medium storing instructions; and
one or more processors in communication with the medium, and the instructions, when executed by the one or more processors, cause the decoding device to:
parse a bitstream to obtain first indication information;
perform a first downsampling operation on a first luma block using a first filter when a value of the first indication information is a first value, or using a second filter when a value of the first indication information is a second value, to obtain a second luma block, wherein the first luma block corresponds to a current chroma block, and wherein the value of the first indication information is the first value when a sample position of the current chroma block has an inconsistency with a sample position of the first luma block in a vertical direction, and a value of the inconsistency is 0.5;
obtain a plurality of chroma samples and a plurality of luma samples, wherein the plurality of chroma samples comprise a plurality of neighboring chroma samples of the current chroma block, and the plurality of luma samples are obtained by performing a second downsampling operation on a plurality of neighboring luma samples of the first luma block;
obtain linear model coefficients based on the plurality of chroma samples and the plurality of luma samples; and
obtain a prediction value of the current chroma block based on the second luma block and the linear model coefficients.

16. The decoding device according to claim 15, wherein the instructions, when executed by the one or more processors, cause the decoding device further to:
parse a sequence parameter set (SPS) parameter in the bitstream, to obtain the first indication information.

17. The decoding device according to claim 16, wherein when the value of the SPS parameter is 0, the first filter is used for performing the first downsampling operation; and when the value of the SPS parameter is 1, the second filter is used for performing the first downsampling operation.

18. The decoding device according to claim 15, wherein the first filter is a filter 0 represented as:

$$LC(xb,yb)=(2*L(2*xb,2*yb)+L(2*xb-1,2*yb)+L(2*xb+1,2*yb)+2*L(2*xb,2*yb+1)+L(2*xb-1,2*yb+1)+L(2*xb+1,2*yb+1)+4)>>3,$$

wherein LC(xb,yb) represents a value of the second luma block corresponding to a sample position (xb, yb) of the current chroma block, and L(,) represents a value of a luma sample of the first luma block.

* * * * *